United States Patent
Iijima et al.

(10) Patent No.: US 12,057,589 B2
(45) Date of Patent: Aug. 6, 2024

(54) CARBON MATERIAL FOR CATALYST CARRIER OF POLYMER ELECTROLYTE FUEL CELL AND METHOD OF PRODUCING THE SAME

(71) Applicant: Nippon Steel Chemical & Material Co., Ltd., Tokyo (JP)

(72) Inventors: Takashi Iijima, Tokyo (JP); Kenichiro Tadokoro, Tokyo (JP); Masataka Hiyoshi, Tokyo (JP); Shinya Furukawa, Tokyo (JP); Tomoko Komura, Tokyo (JP); Kazuyoshi Masaki, Tokyo (JP); Hiroyuki Hayashida, Tokyo (JP); Wakana Tada, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 548 days.

(21) Appl. No.: 17/280,134

(22) PCT Filed: Sep. 28, 2018

(86) PCT No.: PCT/JP2018/036548
§ 371 (c)(1),
(2) Date: Mar. 25, 2021

(87) PCT Pub. No.: WO2020/066010
PCT Pub. Date: Apr. 2, 2020

(65) Prior Publication Data
US 2021/0344019 A1 Nov. 4, 2021

(51) Int. Cl.
*H01M 4/00* (2006.01)
*C01B 32/05* (2017.01)
(Continued)

(52) U.S. Cl.
CPC ............. *H01M 4/926* (2013.01); *C01B 32/05* (2017.08); *C01P 2002/74* (2013.01);
(Continued)

(58) Field of Classification Search
CPC .. H01M 4/9083; H01M 8/1018; H01M 4/926; H01M 10/61; H01M 4/96; H01M 2008/1096; Y02E 60/10; Y02E 60/50
See application file for complete search history.

(56) References Cited

U.S. PATENT DOCUMENTS

2015/0352522 A1  12/2015  Mizuuchi et al.
2016/0329571 A1  11/2016  Matsumoto et al.
(Continued)

FOREIGN PATENT DOCUMENTS

WO   2014/129597 A1   8/2014
WO   2015/088025 A1   6/2015
(Continued)

OTHER PUBLICATIONS

Iijima et. al., Catalyst-Carrier Carbon Material, Solid-Polymer Fuel Cell Catalyst, Solid-Polymer Fuel Cell, and Method for Manufacturing Catalyst-Carrier Carbon Material, Aug. 2016, See the Abstract. (Year: 2016).*

(Continued)

*Primary Examiner* — Cynthia H Kelly
*Assistant Examiner* — Monique M Wills
(74) *Attorney, Agent, or Firm* — Morgan, Lewis & Bockius LLP

(57) ABSTRACT

Provided are a carbon material for a catalyst carrier of a polymer electrolyte fuel cell, the carbon material being a porous carbon material and simultaneously satisfying (1) an intensity ratio ($I_{750}/I_{peak}$) of an intensity at 750° C. ($I_{750}$) and a peak intensity in a vicinity of 690° C. ($I_{peak}$) is 0.10 or less; (2) a BET specific surface area is from 400 to 1,500 m²/g;

(Continued)

(3) an integrated pore volume $V_{2-10}$ of a pore diameter of from 2 to 10 nm is from 0.4 to 1.5 mL/g; and (4) a nitrogen gas adsorption amount $V_{macro}$ at a relative pressure of from 0.95 to 0.99 in the nitrogen gas adsorption isotherm is from 300 to 1,200 cc(STP)/g, as well as a method of producing the same.

20 Claims, 5 Drawing Sheets

(51) Int. Cl.
*H01M 4/92* (2006.01)
*H01M 8/10* (2016.01)
(52) U.S. Cl.
CPC ...... *C01P 2002/82* (2013.01); *C01P 2002/88* (2013.01); *C01P 2004/03* (2013.01); *C01P 2004/04* (2013.01); *C01P 2006/12* (2013.01); *C01P 2006/14* (2013.01); *C01P 2006/16* (2013.01); *C01P 2006/40* (2013.01); *H01M 2008/1095* (2013.01)

(56) References Cited

U.S. PATENT DOCUMENTS

2017/0194652 A1  7/2017  Iijima et al.
2018/0069247 A1  3/2018  Iijima et al.

FOREIGN PATENT DOCUMENTS

| WO | 2015/141810 A1 | 9/2015 | |
|---|---|---|---|
| WO | 2016/133132 A1 | 8/2016 | |
| WO | WO-2016133132 A1 * | 8/2016 | ............ H01M 10/61 |

OTHER PUBLICATIONS

Atsushi Nishikata, "Corrosion Problems Related to Polymer Electrolyte Fuel Cell," Materials and Environments, 58: 288-293 (2009).
International Search Report issued in corresponding International Patent Application No. PCT/JP2018/036548 dated Nov. 6, 2018.

* cited by examiner

CARBON MATERIAL FOR CATALYST CARRIER OF POLYMER ELECTROLYTE FUEL CELL AND METHOD OF PRODUCING THE SAME

TECHNICAL FIELD

The present disclosure relates to a carbon material for a catalyst carrier of a polymer electrolyte fuel cell, and a method of producing the same.

BACKGROUND ART

In recent years, polymer electrolyte fuel cells capable of operating at a low temperature of 100° C. or lower are drawing attention, and the development and practical applications thereof as power supplies for driving vehicles and as stationary power generators are in progress. The basic structure (unit cell) of a common polymer electrolyte fuel cell generally includes: a membrane electrode assembly (MEA) in which catalyst layers that serve as an anode and a cathode are disposed outside a proton-conductive electrolyte membrane on both sides; gas diffusion layers disposed outside the respective catalyst layers so as to sandwich the membrane electrode assembly; and separators further disposed outside these gas diffusion layers. Further, a polymer electrolyte fuel cell is usually formed by stacking a required number of unit cells, in order to achieve a required output.

In a unit cell in such a polymer electrolyte fuel cell, an oxidizing gas such as oxygen or air is supplied to the cathode side, and a fuel such as hydrogen is supplied to the anode side, from gas flow channels of the separators disposed on both the anode side and the cathode side. The supplied oxidizing gas and fuel (these are sometimes referred to as "reaction gases") are respectively supplied to the catalyst layers through the gas diffusion layers, so that work can be generated utilizing an energy difference (electric potential difference) between the chemical reaction occurring in the anode catalyst layer and the chemical reaction occurring in the cathode catalyst layer. For example, in a case in which a hydrogen gas is used as the fuel, and an oxygen gas is used as the oxidizing gas, the energy difference (electric potential difference) between the chemical reaction occurring in the anode catalyst layer [oxidation reaction: $H_2 \rightarrow 2H^+ + 2e^-$ ($E_0 = 0$ V)] and the chemical reaction occurring in the cathode catalyst layer [reduction reaction: $O_2 + 4H^+ + 4e^- \rightarrow 2H_2O$ ($E_0 = 1.23$ V)], is generated as the work.

In the case of a catalyst which is formed into the catalyst layers as described above to allow chemical reactions to occur, a porous carbon material is usually used as a catalyst carrier, from the viewpoint of electronic conductivity, chemical stability and electrochemical stability. Further, Pt or a Pt alloy which can be used under a strongly acidic environment and which shows a high reaction activity in an oxidation reaction and a reduction reaction, is mainly used as a catalyst metal. In general, the above described oxidation reaction and reduction reaction occur on the catalyst metal, and therefore, it is necessary to increase a specific surface area per mass, in order to enhance the utilization ratio of the catalyst metal. Accordingly, particles having a particle size of several nanometers are usually used as the catalyst metal.

The catalyst carrier which support particles of such a catalyst metal needs to be a porous carbon material having a large specific surface area, in order to enhance support capacity as the carrier, namely, in order to increase the number of sites for adsorbing and supporting the catalyst metal particles having a particle size of about several nanometers. In addition, the catalyst carrier needs to be a porous carbon material having a large volume of mesopores having a pore diameter of from 2 to 50 nm, namely, having a large mesopore volume, in order to support the above described catalyst metal particles in a state as highly dispersed as possible. At the same time, in the case of forming the catalyst layers which serve as an anode and a cathode, it is necessary, in order to diffuse the supplied reaction gases into the catalyst layers without resistance, and to discharge water (produced water) produced in the catalyst layers without delay, that micropores suitable for the diffusion of the reaction gases and the discharge of the produced water are formed in the catalyst layers.

Accordingly, for example, VULCAN XC-72 manufactured by Cabot Corporation, EC600JD manufactured by Lion Corporation and EC300 manufactured by Lion Corporation have been conventionally used, as porous carbon materials which have a relatively large specific surface area and mesopore volume, and which have a dendritic structure with three-dimensionally developed branches, at the same time. Further, attempts have been made to develop a porous carbon material having a more favorable specific surface area and mesopore volume, as well as a more favorable dendritic structure, as a carbon material for a catalyst carrier. One which is starting to draw particular attention, in recent years, is a dendritic carbon nanostructure which is produced by forming, as an intermediate, a metal acetylide, such as a silver acetylide having a three-dimensional dendritic structure that is three-dimensionally branched, and in which this three-dimensional dendritic structure is retained. So far, several proposals have been made regarding this dendritic carbon nanostructure.

For example, Patent Document 1 proposes a carbon material for a catalyst carrier which allows for the production of a catalyst for a polymer electrolyte fuel cell that achieves a low rate of decrease in the amount of current over a long period of time, and that has an excellent durability.

Specifically, Patent Document 1 proposes a porous carbon material produced by the following production method. This method includes: a step of preparing a solution containing a metal or a metal salt; a step of blowing an acetylene gas into the solution to form a dendritic carbon nanostructure composed of a metal acetylide; a step of heating the carbon nanostructure at a temperature of from 60 to 80° C., to form a metal-encapsulated dendritic carbon nanostructure in which the metal is-encapsulated in the dendritic carbon nanostructure; a step of heating the metal-encapsulated dendritic carbon nanostructure to a temperature of from 160 to 200° C. to allow the metal to gush out, to form a dendritic mesoporous carbon structure; and a step of heating the mesoporous carbon structure in a reduced pressure atmosphere or in an inert gas atmosphere, to a temperature of from 1,600 to 2,200° C. This porous carbon material has a pore diameter of from 1 to 20 nm and an integrated pore volume of from 0.2 to 1.5 cc/g, which are determined by analyzing a nitrogen adsorption isotherm by Dollimore-Heal method, and a BET specific surface area of from 200 to 1,300 m²/g.

Patent Document 2 proposes a carrier carbon material which allows for the production of a catalyst for a polymer electrolyte fuel cell capable of achieving a high battery performance under highly humidified conditions.

Specifically, Patent Document 2 proposes a porous carbon material produced by the following production method. This method includes: an acetylide production step of blowing an acetylene gas into an aqueous ammoniacal solution containing a metal or a metal salt, to produce a metal acetylide; a first heat treatment step of heating the metal acetylide at a temperature of from 60 to 80° C., to form a metal particle-encapsulated intermediate; a second heat treatment step of heating the metal particle-encapsulated intermediate at a temperature of from 120 to 200° C. to allow the metal particles to gush out from the metal particle-encapsulated intermediate, to obtain a carbon material intermediate; a cleaning treatment step of bringing the carbon material intermediate into contact with a hot concentrated sulfuric acid, to clean the carbon material intermediate; and a third heat treatment step of further heat-treating the cleaned carbon material intermediate at a temperature of from 1,000 to 2,100° C., to obtain a carrier carbon material. This porous carbon material has a predetermined hydrogen content, a BET specific surface area of from 600 to 1,500 m$^2$/g, and a relative intensity ratio ($I_D/I_G$) of the peak intensity of D-band ($I_D$) in a range of from 1,200 to 1,400 cm$^{-1}$ to the peak intensity of G-band ($I_G$) in a range of from 1,500 to 1,700 cm$^{-1}$, determined from a Raman spectroscopic spectrum, of from 1.0 to 2.0.

Further, Patent Document 3 proposes a carbon material for a catalyst carrier which allows for the production of a catalyst for a polymer electrolyte fuel cell capable of exhibiting an excellent durability against electric potential fluctuations, while maintaining a high power-generation performance.

Specifically, Patent Document 3 proposes a porous carbon material produced by the following production method. This method includes: an acetylide production step of blowing an acetylene gas into an aqueous ammoniacal solution containing a metal or a metal salt, to produce a metal acetylide; a first heat treatment step of heating the metal acetylide at a temperature of from 40 to 80° C., to form a metal particle-encapsulated intermediate; a second heat treatment step of subjecting the metal particle-encapsulated intermediate to compacting, and heating the resulting compact to a temperature of 400° C. or higher at a temperature rise rate of 100° C. per minute or higher to allow the metal particles to gush out from the metal particle-encapsulated intermediate, to obtain a carbon material intermediate; a cleaning treatment step of bringing the carbon material intermediate into contact with a hot concentrated nitric acid or a hot concentrated sulfuric acid, to clean the carbon material intermediate; and a third heat treatment step of further heat-treating the cleaned carbon material intermediate in a vacuum or in an inert gas atmosphere, at a temperature of from 1,400 to 2,100° C., to obtain a carrier carbon material. This porous carbon material has a specific surface area SA of mesopores having a pore diameter of from 2 to 50 nm, which is determined by analyzing a nitrogen adsorption isotherm of adsorption process by the Dollimore-Heal method, of from 600 to 1,600 m$^2$/g; and a relative intensity ratio ($I_{G'}/I_G$) of the peak intensity of G'-band ($I_{G'}$) in a range of from 2,650 to 2,700 cm$^{-1}$ to the peak intensity of G-band ($I_G$) in a range of from 1,550 to 1,650 cm$^{-1}$ in a Raman spectroscopic spectrum, of from 0.8 to 2.2. Further, the porous carbon material has: a specific pore surface area $S_{2-10}$ of mesopores having a pore diameter of 2 nm or more but less than 10 nm, of all mesopores, of from 400 to 1,100 m$^2$/g, and a specific pore volume $V_{2-10}$ thereof of from 0.4 to 1.6 cc/g; a specific pore surface area $S_{10-50}$ of mesopores having a pore diameter of from 10 nm to 50 nm, of all mesopores, of from 20 to 150 m$^2$/g, and a specific pore volume $V_{2-10}$ thereof of 0.4 to 1.6 cc/g; and a specific pore surface area $S_2$ of pores having a pore diameter of less than 2 nm, which is determined by analyzing the nitrogen adsorption isotherm of the adsorption process by Horvath-Kawazoe method, of from 250 to 550 m$^2$/g.

Still further, Patent Document 4 proposes a carbon material for a catalyst carrier which allows for the production of a catalyst for a polymer electrolyte fuel cell that has an excellent durability against repeated load fluctuations, such as starting and stopping, and that has an excellent power generation performance under low-humidified operation conditions.

Specifically, Patent Document 4 discloses a carbon material for a catalyst carrier, obtained using, as a raw material, a porous carbon material [brand name: ESCARBON (registered trademark)-MCND; manufactured by Nippon Steel & Sumikin Chemical Co., Ltd.] which has a dendritic carbon nanostructure prepared via an autolysis explosive reaction, with a metal acetylide as an intermediate, and by performing a graphitizing treatment, followed by an oxidation treatment using hydrogen peroxide, nitric acid, an in-liquid plasma device, and the like. This carbon material for a catalyst carrier has: an oxygen content $O_{ICP}$ of from 0.1 to 3.0% by mass; a residual oxygen amount $O_{1200° C.}$, which is the amount of oxygen remaining after a heat treatment in an inert gas (or vacuum) atmosphere at 1,200° C., of from 0.1 to 1.5% by mass; a BET specific surface area of from 300 to 1,500 m$^2$/g; a half width ΔG of the G-band detected in a range of from 1,550 to 1,650 cm$^{-1}$ in a Raman spectroscopic spectrum, of from 30 to 70 cm$^{-1}$; and a residual hydrogen amount $H_{1200° C.}$, which is the amount of hydrogen remaining after a heat treatment in an inert gas (or vacuum) atmosphere at 1,200° C., of from 0.005 to 0.080% by mass.

Patent Document 1: WO 2014/129597 A1
Patent Document 2: WO 2015/088025 A1
Patent Document 3: WO 2015/141810 A1
Patent Document 4: WO 2016/133132 A1
Non-Patent Document 1: Atsushi Nishikata (2009), "Corrosion Problems Related to Polymer Electrolyte Fuel Cell", Materials and Environments, Vol. 58, 288-293.

SUMMARY OF THE INVENTION

Technical Problem

Each of the carbon materials for a catalyst carrier disclosed in Patent Documents 1 to 4 described above is a carbon material which has a relatively large specific surface area, in which the density of support positions, namely, the density of positions where a catalyst metal is supported on a carrier (particle number density) is high, in which the absolute amount thereof can be increased, and which is capable of supporting catalyst metal particles in a small size, at a high density and uniformly (homogeneously). Therefore, these carbon materials for a catalyst carrier exhibit predetermined power generation characteristics in the production of a catalyst for a polymer electrolyte fuel cell. However, it has been revealed, during the examinations by the present inventors to further improve the power generation characteristics, that there is room for improvement from the viewpoint of dispersibility (uniformity) of the catalyst metal.

In other words, in a case in which catalyst metal particles have varying particle sizes, it is known that, when electric potential cycles are repeated during the use of a fuel cell, the dissolution of particles of the catalyst metal (Pt) occurs at a high potential and the precipitation of Pt occurs at a low potential, on the cathode side, due to the so-called Ostwald ripening, a phenomenon referring to the growing of particles (see Non-Patent Document 1). An increase in the particle size of the catalyst metal particles results in a decrease in reaction area of the catalyst metal to cause a decrease in the utilization ratio of the catalyst metal. As a result, the output of a battery is reduced, leading to a decreased durability. Thus, in order to prevent the above described deterioration over time as much as possible, it is required that the catalyst metal to be supported on the catalyst carrier have a narrow particle size distribution so as to be supported uniformly, namely, that a uniform distance between the particles can be achieved.

Further, although the carbon materials for a catalyst carrier disclosed in Patent Documents 1 to 4 all have a relatively large specific surface area and mesopore volume, the inventors of the present disclosure have further examined in detail. As a result, it has been surprisingly confirmed that a highly crystalline and non-porous massive carbon (hereinafter, referred to as "graphitized product" in the present disclosure; see FIG. 1) which is thought to interfere with the dispersibility (uniformity) of a part of the catalyst metal is incorporated, although in a small amount, in a skeleton-forming carbon forming the carbon material for a catalyst carrier, even in such a conventional carbon material for a catalyst carrier. The inventors have thus discovered that the presence of the graphitized product is one cause for deteriorating the uniformity of the carrier surface.

The inventors of the present disclosure have intensively investigated to find out how such a graphitized product is formed and incorporated in the carbon material for a catalyst carrier, and to find out the method of quantitatively evaluating the degree of the formation and incorporation thereof, and the method of reducing the formation and incorporation thereof as much as possible. As a result, the inventors have obtained the following findings.

In other words, in order to produce the carbon material for a catalyst carrier as described above, an acetylene gas is first blown into an aqueous ammoniacal solution containing a metal or a metal salt, specifically, silver nitrate, to produce silver acetylide, as described above. In the production of the silver acetylide, the acetylene gas is blown into the solution such that a slightly excessive amount of acetylene is introduced into a reaction system, taking into consideration the molar ratio of silver nitrate and acetylene to be reacted in the reaction system. When the acetylene gas is blown in an amount exceeding the equivalence point of silver nitrate and acetylene, an excessive amount of the acetylene gas is adsorbed to the silver acetylide to be produced. When the silver acetylide which has adsorbed an excessive amount of the acetylene gas is subjected to the subsequent autolysis explosive reaction, a certain amount of "carbon with low aromaticity" (hereinafter, referred to as "soot" in the present disclosure) is inevitably formed to be incorporated, in carbon with high aromaticity.

The reason for assuming that the "carbon with low aromaticity (soot)" has been formed is as follows. The carbon with high aromaticity is usually formed in the process of the autolysis explosion of the silver acetylide. However, as will be described later, it has been confirmed that a treatment with a predetermined oxidizing agent solution, in the cleaning treatment step after removing silver with a dilute nitric acid from a decomposition product (carbon material intermediate) obtained after the autolysis explosion, have reduced the formation and incorporation of the graphitized product in a target product (carbon material for a catalyst carrier) obtained through the subsequent heat treatment step. In other words, it is assumed that the graphitized product is a low molecular weight component (namely, a component with low aromaticity) which can be dissolved and removed by such a treatment with a predetermined oxidizing agent solution. The inventors have thus discovered that the graphitized product formed as described above causes the inactivation of the surface of the carbon material for a catalyst carrier, namely, that it is difficult for this highly crystalline and inert surface of the graphitized product to support the particles of the catalyst metal, causing a decrease in the dispersibility (uniformity) of the particles.

Although a treatment with nitric acid as an oxidizing agent is also carried out in the production of conventional carbon materials for a catalyst carrier, represented by those disclosed in Patent Documents 1 to 4, this treatment is mainly intended to remove silver from the decomposition product (carbon material intermediate) produced in a decomposition step. Since the treatment with nitric acid is carried out for a short treatment time of 1 hour, and no heating is carried out therein, the oxidizing power of nitric acid is not so strong, and this treatment is insufficient for removing the carbon with low aromaticity (soot) of which presence has been found this time.

Further, Patent Document 2 discloses the method of bringing a concentrated sulfuric acid into contact with a carbon material intermediate at 200° C. to remove silver, which method is intended to remove silver while reducing the functionalization of carbon (carbon consumption), by using a hot concentrated sulfuric acid. Therefore, this method as well is incapable of removing the carbon with low aromaticity (soot) of which presence has been found this time.

Moreover, the thus formed carbon with low aromaticity (soot) is a carbon which turns into a non-porous massive carbon during the subsequent heat treatment step, of which pore walls and the like are not restrained, and of which shape is not restricted. As a result, the carbon grows freely to form graphite (graphitized product) with developed crystallinity, regarding which no prediction has been given in Patent Documents 1 to 4.

The present inventors have found out that a carbon material for a catalyst carrier into which the graphitized product is incorporated due to the formation of the carbon with low aromaticity (soot) as described above, contains flame-retardant (oxidation consumption resistant) components in an amount larger than that of the skeleton-forming carbon of the carbon material for a catalyst carrier. This is discovered by the fact that a weight loss curve (derivative thermogravimetric curve, DTG) extends to the high temperature side like a hem being pulled, immediately before burning-out, due to the presence of the highly crystalline and low-porous graphitized product, in a thermogravimetric analysis (carbon oxidation consumption test) under an air atmosphere. The inventors have also found out that the presence of the flame-retardant components strongly correlates with support properties for supporting the catalyst metal particles.

Further, with regard to reducing the formation of such a graphitized product, the inventors paid attention to the fact that the carbon with low aromaticity (soot) is more easily oxidized as compared to the carbon with high aromaticity. Utilizing this characteristic, the inventors have intensively examined treatment methods, aiming to remove the carbon with low aromaticity (soot), in the cleaning treatment step after removing silver with a dilute nitric acid from the carbon material intermediate formed by the autolysis explosive reaction of the silver acetylide. As a result, it has been discovered that the formation of the resulting graphitized product can be reduced as much as possible, by removing silver using a dilute nitric acid, and by performing a treatment with a predetermined oxidizing agent solution for removing the carbon with low aromaticity (soot) in addition. Moreover, it has been found out that the above treatments have no particular impact on the properties (such as the specific surface area and the mesopore volume) to be required as a catalyst carrier, in the resulting carbon material for a catalyst carrier. The present disclosure has thus been completed.

The present disclosure has been made on the above described findings, and an object thereof is to provide a carbon material for a catalyst carrier suitable for producing a catalyst of a polymer electrolyte fuel cell which has favorable support properties for supporting a catalyst metal (namely, uniformity in supporting catalyst metal particles), and with which excellent power generation characteristics, and an excellent durability as a fuel cell can be achieved.

Solution to Problem

In other words, the present disclosure is as follows.

[1] A carbon material for a catalyst carrier of a polymer electrolyte fuel cell, the carbon material being a porous carbon material and simultaneously satisfying (1), (2), (3) and (4) below:
(1) an intensity ratio ($I_{750}/I_{peak}$) of an intensity at 750° C. ($I_{750}$) and a peak intensity in a vicinity of 690° C. ($I_{peak}$), in a derivative thermogravimetric curve (DTG) obtained by a thermogravimetric analysis when a temperature is raised at a rate of 10° C./min under an air atmosphere, is 0.10 or less;
(2) a BET specific surface area, determined by BET analysis of a nitrogen gas adsorption isotherm, is from 400 to 1,500 m$^2$/g;
(3) an integrated pore volume $V_{2-10}$ of a pore diameter of from 2 to 10 nm, determined by analysis of the nitrogen gas adsorption isotherm using Dollimore-Heal method, is from 0.4 to 1.5 mL/g; and
(4) a nitrogen gas adsorption amount V macro at a relative pressure of from 0.95 to 0.99 in the nitrogen gas adsorption isotherm is from 300 to 1,200 cc(STP)/g.
[2] The carbon material for a catalyst carrier of a polymer electrolyte fuel cell according to [1], wherein a residual weight ratio at 750° C. in the thermogravimetric analysis when the temperature is raised at a rate of 10° C./min under an air atmosphere is 3% or less.
[3] The carbon material for a catalyst carrier of a polymer electrolyte fuel cell according to [1] or [2], wherein a half width ΔG of a G-band detected in a range of from 1,550 to 1,650 cm$^{-1}$ in a Raman spectroscopic spectrum is from 50 to 70 cm$^{-1}$.
[4] The carbon material for a catalyst carrier of a polymer electrolyte fuel cell according to any one of [1] to [3], wherein the $V_{2-10}$ is from 0.5 to 1.0 mL/g.
[5] The carbon material for a catalyst carrier of a polymer electrolyte fuel cell according to any one of [1] to [4], comprising a three-dimensional dendritic structure in which a rod-shaped body or an annular body is three-dimensionally branched.
[6] A method of producing a carbon material for a catalyst carrier of a polymer electrolyte fuel cell, the method comprising:
a silver acetylide production step of blowing an acetylene gas into a reaction solution consisting of an aqueous ammonia solution of silver nitrate, to synthesize a silver acetylide;
a decomposition step of allowing an autolysis explosive reaction of the silver acetylide, to obtain a carbon material intermediate;
a silver removal step of bringing the carbon material intermediate into contact with a dilute nitric acid, to remove silver from the carbon material intermediate;
a cleaning treatment step of bringing the carbon material intermediate, from which silver has been removed, into contact with an oxidizing agent solution, to clean the carbon material intermediate; and
a heat treatment step of heat-treating the cleaned carbon material intermediate at a temperature of from 1,400 to 2,200° C. in a vacuum or in an inert gas atmosphere, to obtain a carbon material for a catalyst carrier,
wherein at least one selected from the group consisting of a permanganate solution and a hydrogen peroxide solution is used as the oxidizing agent solution.

Advantageous Effects of Invention

The carbon material for a catalyst carrier according to the present disclosure enables to provide a carbon material for a catalyst carrier suitable for producing a catalyst of a polymer electrolyte fuel cell which has favorable support properties for supporting a catalyst metal (namely, uniformity in supporting catalyst metal particles), and with which excellent power generation characteristics, and an excellent durability as a fuel cell can be achieved.

DESCRIPTION OF EMBODIMENTS

Figure 1:
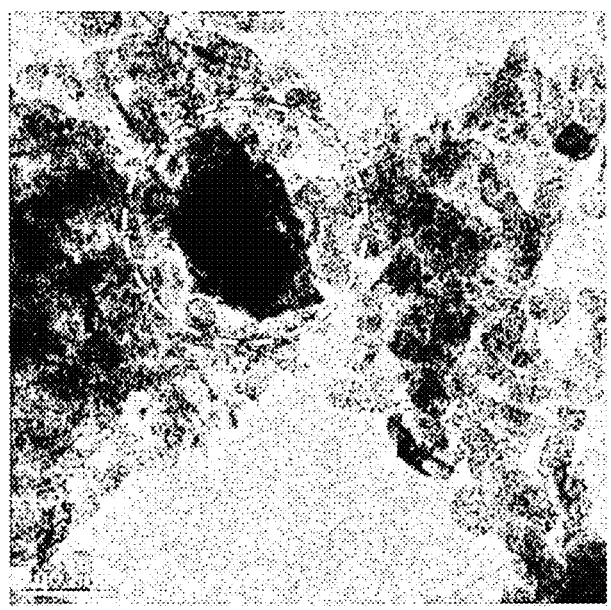
FIG. 1 is an explanatory diagram (image) for showing a graphitized product (shown within the area surrounded by a white dotted line) which is confirmed by TEM observation of a carbon material for a catalyst carrier of Experimental Example 27.

A carbon material for a catalyst carrier of a polymer electrolyte fuel cell according to the present disclosure and a method of producing the same will now be described in detail.

The carbon material for a catalyst carrier of a polymer electrolyte fuel cell according to the present disclosure is a porous carbon material simultaneously satisfying (1), (2), (3) and (4) below:

(1) an intensity ratio ($I_{750}/I_{peak}$) of an intensity at 750° C. ($I_{750}$) and a peak intensity in a vicinity of 690° C. ($I_{peak}$), in a derivative thermogravimetric curve (DTG) obtained by a thermogravimetric analysis when a temperature is raised at a rate of 10° C./min under an air atmosphere, is 0.10 or less;

(2) a BET specific surface area, determined by BET analysis of a nitrogen gas adsorption isotherm, is from 400 to 1,500 m$^2$/g;

(3) an integrated pore volume $V_{2\text{-}10}$ of a pore diameter of from 2 to 10 nm, determined by analysis of the nitrogen gas adsorption isotherm using Dollimore-Heal method, is from 0.4 to 1.5 mL/g; and (4) a nitrogen gas adsorption amount $V_{macro}$ at a relative pressure of from 0.95 to 0.99 in the nitrogen gas adsorption isotherm is from 300 to 1,200 cc(STP)/g.

First, regarding (1) described above, the carbon material for a catalyst carrier according to the present disclosure is one in which the formation and incorporation of a nonporous massive carbon (graphitized product) which is thought to interfere with the dispersibility (uniformity) of the catalyst metal to be supported, as described above, is reduced as much as possible. In the above (1), a thermogravimetric analysis is used as the method of representing the abundance of such a graphitized product. Specifically, the thermogravimetric analysis is carried out as follows. In other words, a sample is set to a thermogravimetric analysis apparatus, the weight loss of the sample at a temperature rise rate of 10° C./min under an air atmosphere is measured, a weight loss curve (TGA) thereby obtained is differentiated over time to obtain a derivative thermogravimetric curve (DTG). An extremely intense peak (the intensity thereof is referred to as "$I_{peak}$" in the present disclosure) appearing in the vicinity of 690° C. in the resulting DTG is taken as attributable to the combustion of the skeleton-forming carbon of the carbon material for a catalyst carrier. The portion (the intensity thereof is referred to as "$I_{750}$" in the present disclosure) of the curve appearing so as to rise (like a hem being pulled) at 750° C., which is on the temperature side higher than 690° C., is taken as attributable to the combustion of the graphitized product. The relative intensity ratio ($I_{750}/I_{peak}$) of these intensities is used to represent that the abundance of the graphitized product is small. This method has been discovered by assuming that the graphitized product is present in an extremely low amount in the carbon material for a catalyst carrier, and is graphite with developed crystallinity compared with the skeleton-forming carbon, and by focusing on the fact that the graphitized product is therefore flame retardant (oxidation consumption resistant). Further, this method has been discovered based on the fact that the derivative thermogravimetric curve (DTG) in this analysis is capable of representing these peaks or the intensities thereof with a favorable reproducibility, and, in addition, that a favorable correlation with a decrease in the support properties for supporting catalyst metal particles (namely, a decrease in the uniformity of the particle size) can be observed, as will be understood by Examples to be described later.

The "extremely intense peak appearing in the vicinity of 690° C." (namely, the peak in the vicinity of 690° C.) as used herein refers to a peak of which peak top appears within a range of 690±50° C. and which has the maximum value of the DTG The carbon material for a catalyst carrier according to the present disclosure is preferably one in which the formation and incorporation of such a graphitized product is reduced as much as possible, from the viewpoint of the support properties for supporting a catalyst metal (namely, uniformity in supporting catalyst metal particles). Therefore, it is required that the intensity ($I_{750}$) of the graphitized product is as small as possible compared to the peak intensity ($I_{peak}$) of the skeleton-forming carbon, namely, that the intensity ratio ($I_{750}/I_{peak}$) is 0.10 or less. The intensity ratio ($I_{750}/I_{peak}$) is preferably 0.09 or less, and more preferably 0.08 or less. The intensity ratio ($I_{750}/I_{peak}$) is most preferably as close to zero as possible (namely, a lower limit value of the intensity ratio ($I_{750}/I_{peak}$) is most preferably 0). However, the flame-retardant (oxidation consumption resistant) components can be formed not only as those derived from the carbon with low aromaticity (soot), but also by a structural change in the process of high temperature baking. Therefore, the intensity ratio ($I_{750}/I_{peak}$) may be 0.001 or more.

When the intensity ratio ($I_{750}/I_{peak}$) is increased to more than 0.10, the content of the graphitized product contained in the carbon material is increased, possibly making it difficult for the catalyst metal microparticles to be uniformly supported on the surface of the carbon material as the carrier. Further, the catalyst particles supported on the graphitized product has a weak interaction with the surface of the carbon material, and may easily fall or aggregate. As a result, there is a risk that the particle size of the catalyst metal microparticles may increase under a fuel cell-operating environment.

The intensity ratio ($I_{750}/I_{peak}$) is a value determined by the measurement method described in Examples to be described later.

In the above described carbon material for a catalyst carrier according to the present disclosure, it is necessary that the BET specific surface area determined by BET analysis of a nitrogen gas adsorption isotherm is from 400 to 1,500 m$^2$/g, as described in the above (2), and preferably from 500 m$^2$/g to 1,400 m$^2$/g. When the BET specific surface area is 400 m$^2$/g or more, preferably 500 m$^2$/g or more, catalyst metal particles having a particle size of several nanometers are supported in a well dispersed state, namely, in a state where the distance between the catalyst metal particles is maintained at equal or higher than a certain value and the particles can be present individually. In contrast, when the BET specific surface area is less than 400 m$^2$/g, the distance between the catalyst particles is decreased, possibly making it difficult for the catalyst metal microparticles to be supported uniformly and at a high density. As a result, the effective area of the catalyst metal particles is reduced, leading to a significant decrease in fuel battery performance. Further, when the BET specific surface area is increased to more than 1,500 m$^2$/g, edge portions in the porous carbon material are increased. This is accompanied by a substantial decrease in the crystallinity, and the durability may be more likely to be decreased.

The BET specific surface area is a value determined by the measurement method described in Examples to be described later.

In the above described carbon material for a catalyst carrier according to the present disclosure, it is necessary that the integrated pore volume $V_{2\text{-}10}$ of a pore diameter of from 2 to 10 nm determined by analysis of the nitrogen gas adsorption isotherm using the Dollimore-Heal method is from 0.4 to 1.5 mL/g, as described in the above (3), and preferably from 0.5 to 1.0 mL/g. By having a pore diameter of from 2 to 10 nm as described above, catalyst metal microparticles, which are usually prepared to a diameter of several nanometers, can be dispersed in the pores in a highly dispersed state, and favorably contributes to improving the utilization ratio of the catalyst. When the pore volume $V_{2\text{-}10}$ is less than 0.4 mL/g, the pore volume is small relative to the pore surface area, and thus results in a decrease in average pore size. In a case in which the microparticles of platinum as a catalyst metal are supported in the pores, the size of the gaps between the pores and the platinum microparticles is reduced. As a result, gas diffusion may be reduced to cause a decrease in large current characteristics. In contrast, when the $V_{2\text{-}10}$ is more than 1.5 mL/g, the thickness of the skeleton as the carbon material for a carrier is reduced, resulting in a decrease in oxidation consumption resistance. In addition, the skeleton of this carbon material for a carrier is easily destroyed by stirring which is required in the preparation of a catalyst layer ink liquid for forming catalyst layers, possibly resulting in a failure to exhibit characteristics derived from the shape.

The integrated pore volume $V_{2\text{-}10}$ is a value determined by the measurement method described in Examples to be described later.

In the carbon material for a catalyst carrier according to the present disclosure, the residual weight ratio of the graphitized product (namely, the incorporation amount of the graphitized product which is incorporated into the carbon material for a catalyst carrier) at 750° C. in the thermogravimetric analysis when the temperature is raised at a rate of 10° C./min under an air atmosphere is preferably 3% or less, and more preferably 2% or less. The incorporation amount (residual weight ratio) of the graphitized product is most preferably as close to zero as possible (namely, the lower limit value of the incorporation amount (residual weight ratio) of the graphitized product is most preferably 0). However, the flame-retardant (oxidation consumption resistant) components can be formed not only as those derived from the carbon with low aromaticity (soot), but also by a structural change in the process of high temperature baking. Therefore, the incorporation amount (residual weight ratio) of the graphitized product may be 0.01 or more.

Figure 2A:
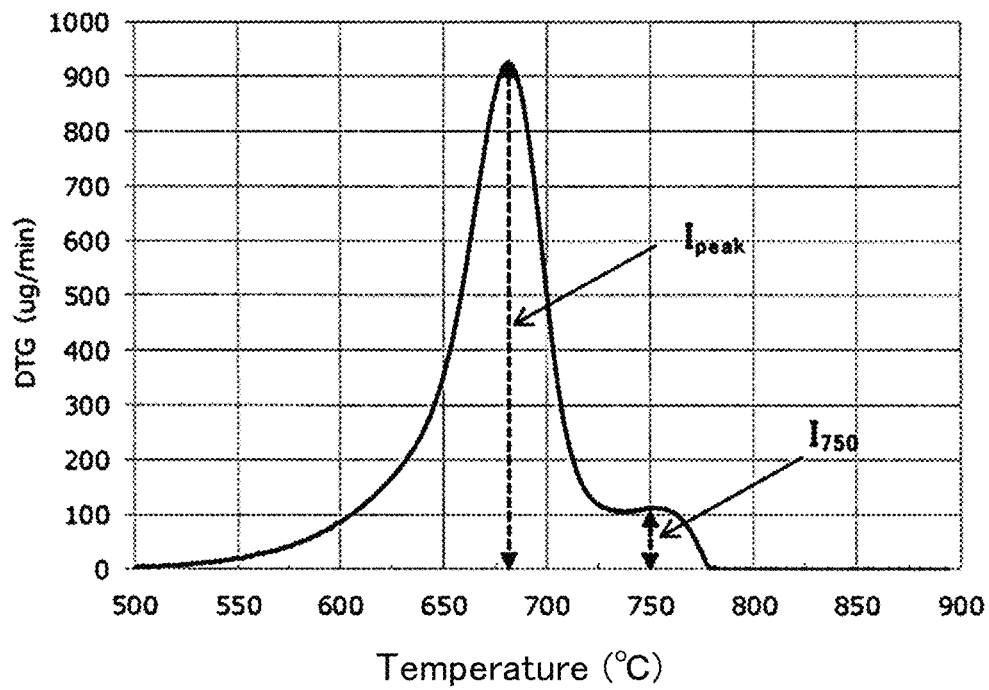
FIG. 2A is an explanatory diagram illustrating a method of determining each of $I_{750}$, and $I_{peak}$, in order to obtain an intensity ratio ($I_{750}/I_{peak}$) according to the present disclosure.
Figure 2B:
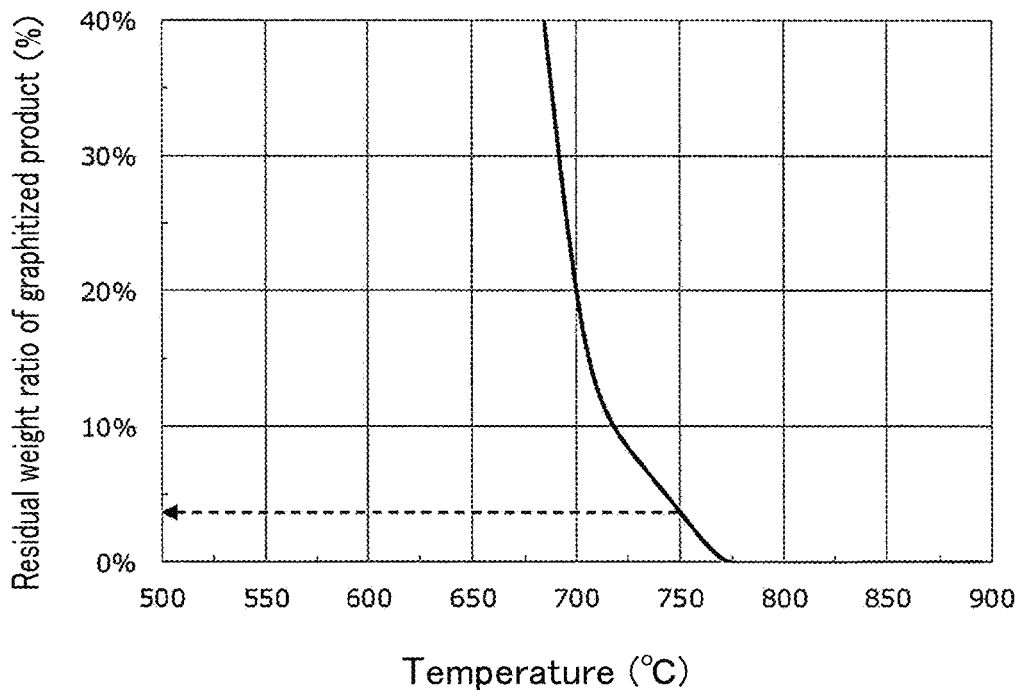
FIG. 2B is an explanatory diagram illustrating a method of determining a residual weight ratio (%) according to the present disclosure.
Figure 3A:
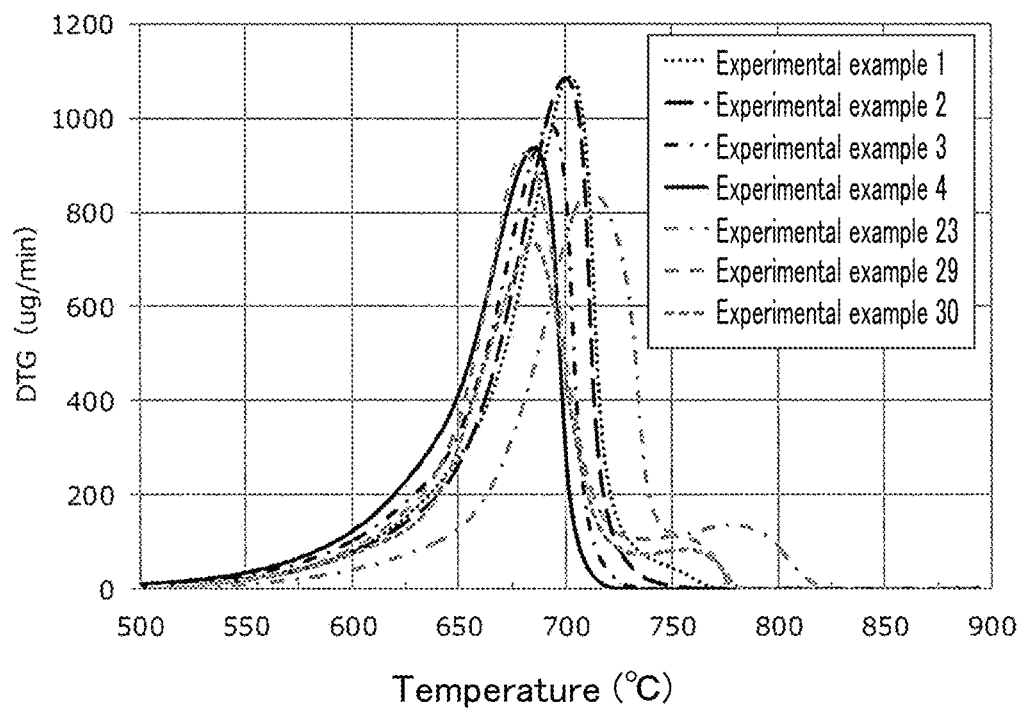
FIG. 3A is a graph showing derivative thermogravimetric curves [relationship between temperature and amount of weight loss (μg/min)] in thermogravimetric analyses performed in Experimental Examples 1 to 4, 23, and 27 to 28 of the present disclosure.
Figure 3B:
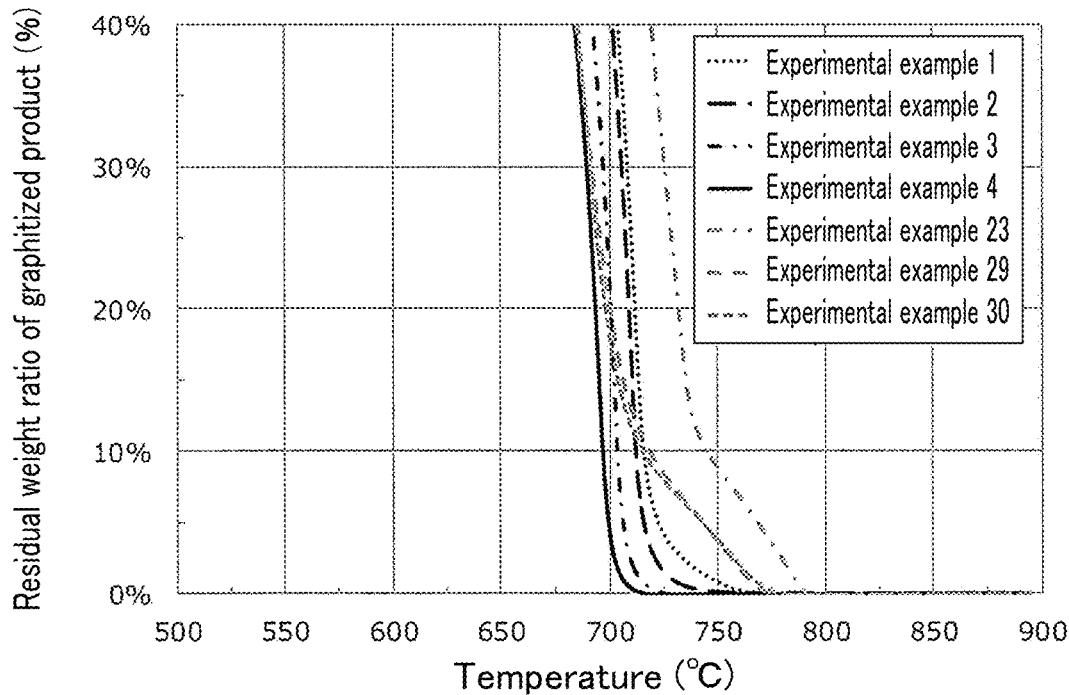
FIG. 3B is an enlarged graph in which intensities observed at a temperature of 750° C., in the thermogravimetric analyses (TGA) used when obtaining the graph shown in FIG. 3A, are shown as the residual weight ratios (%).

The incorporation amount (residual weight ratio) of the graphitized product is the abundance of the graphitized product itself, determined focusing on the residual weight of the graphitized product at 750° C. in the thermogravimetric analysis (TGA), separately from the above described intensity ratio ($I_{750}/I_{peak}$). Specifically, as shown in FIG. 2B, the abundance of the graphitized product itself is a numerical value calculated from the relationship between the increase in the temperature and the incorporation amount (residual weight ratio) of the graphitized product in the thermogravimetric analysis (TGA).

The incorporation amount (residual weight ratio) of the graphitized product is a value determined by the measurement method described in Examples to be described later.

In the carbon material for a catalyst carrier according to the present disclosure, the half width $\Delta G$ of the G-band detected in a range of from 1,550 to 1,650 cm$^{-1}$ in a Raman spectroscopic spectrum is preferably from 50 to 70 cm$^{-1}$, and more preferably from 50 to 65 cm$^{-1}$, from the viewpoint of enhancing the crystallinity of the carbon material to improve the durability under a fuel cell-operating environment. The $\Delta G$ indicates the spread of a carbon net plane of the carbon material. When the $\Delta G$ is less than 50 cm$^{-1}$, the carbon net plane becomes too widely spread, and the amount of edges of the carbon net plane forming the pore walls is decreased. This tends to result in a decrease in the support properties for supporting catalyst metal microparticles on the pore walls. In contrast, when the $\Delta G$ is increased to more than 70 cm$^{-1}$, the carbon net plane becomes narrow, and this causes an increase in the amount of edges of the carbon net plane which is susceptible to oxidation consumption. As a result, the durability tends to decrease.

The half width $\Delta G$ of the G-band is a value determined by the measurement method described in Examples to be described later.

Further, in the carbon material for a catalyst carrier according to the present disclosure, it is necessary that the nitrogen gas adsorption amount $V_{macro}$ adsorbed within a range of a relative pressure of from 0.95 to 0.99, in the nitrogen gas adsorption isotherm, is from 300 to 1,200 cc (STP)/g, as described in the above (4), and preferably from 300 to 800 cc(STP)/g, from the viewpoint of improving gas diffusivity in the interior of the micropores to be formed in the catalyst layers. The nitrogen gas adsorption amount $V_{macro}$ at a relative pressure of from 0.95 to 0.99 indicates the size of macropores formed by gaps between primary particles. When the value of $V_{macro}$ is within the above described range, the carbon material has a highly developed three-dimensional dendritic structure. By allowing the three-dimensional dendritic structure to develop, it is possible to avoid a situation (a situation where the reaction of the resulting battery is inhibited) which occurs due to a decrease in the supply of raw material gases ($H_2$, $O_2$), or due to a failure to discharge $H_2O$ produced, when used in a polymer electrolyte fuel cell. In other words, this enables to form a fuel cell having favorable large current characteristics, and thus is preferred. However, too large a value of $V_{macro}$ causes a decrease in the amount of carbon contained in the catalyst layers upon the formation thereof, making it difficult to maintain the shape of the catalyst layers.

The nitrogen gas adsorption amount $V_{macro}$ is a value determined by the measurement method described in Examples to be described later.

In the method of producing the above described carbon material for a catalyst carrier according to the present disclosure, it is necessary to remove the carbon with low aromaticity (soot) which is inevitably incorporated into the carbon material intermediate obtained by the autolysis explosion of the silver acetylide as much as possible. Therefore, instead of removing silver using a concentrated nitric acid which has been commonly used so far, silver alone is first selectively dissolved using a dilute nitric acid having a concentration of from 5 to 30% by mass, for example, and then a predetermined oxidizing agent solution is used to remove the carbon with low aromaticity (soot). By performing a two-stage treatment, as described above, the carbon with low aromaticity (soot) can be effectively removed. Such a predetermined oxidizing agent solution may be, for example, at least one selected from the group consisting of an aqueous permanganate solution and an aqueous hydrogen peroxide solution, because of having a high oxidizing power.

By using the cleaned carbon material intermediate which is obtained in the cleaning treatment step as described above, and from which the carbon with low aromaticity has been removed as much as possible, it is possible to produce the carbon material for a catalyst carrier according to the present disclosure, in the same manner as a conventional method.

In other words, the carbon material for a catalyst carrier according to the present disclosure can be produced by: blowing an acetylene gas into a reaction solution consisting of an aqueous ammonia solution of silver nitrate, to synthesize a silver acetylide (silver acetylide production step); allowing the autolysis explosive reaction of the resulting silver acetylide at a temperature of from 120 to 400° C., to obtain a carbon material intermediate (decomposition step); removing silver from the thus obtained carbon material intermediate using a dilute nitric acid (silver removal step); then bringing the carbon material intermediate into contact with a predetermined oxidizing agent solution, to clean the carbon material intermediate (cleaning treatment step); and heat-treating the cleaned carbon material intermediate at a temperature of from 1,400 to 2,200° C. (preferably from 1,800 to 2,100° C.) in a vacuum or in an inert gas atmosphere (heat treatment step).

One example of each step will now be described in detail.

(Silver Acetylide Production Step)

The silver acetylide production step is not particularly limited as long as the step is performed by a known method. For example, it is possible to use the method described in Patent Document 1, in which an aqueous silver nitrate solution is brought into contact with acetylene molecules to produce silver acetylide.

The method of bringing an acetylene gas into contact with an aqueous silver nitrate solution is not particularly limited, and may be, for example, a method of allowing an acetylene gas to pass through an aqueous silver nitrate solution, more specifically, a method of blowing an acetylene gas into an aqueous silver nitrate solution.

When an acetylene gas is brought into contact with an aqueous silver nitrate solution, it is preferred to stir the aqueous silver nitrate solution. This increases the frequency of contact between the acetylene gas and the aqueous silver nitrate solution, enabling to efficiently produce silver acetylide. The stirring may be performed using a common stirring blade, or using a stir bar such as a magnet stirrer. In this manner, the silver acetylide can be obtained as bulky precipitates of white crystals.

(Decomposition Step)

Next, the resulting silver acetylide is decomposed by heating, to obtain a carbon material intermediate. By heating the silver acetylide, the silver acetylide explodes at nanoscale, and separates into silver and carbon phases. At this time, silver forms nano-sized particles, or gasified due to reaction heat and gushes out to the surface portion. Meanwhile, carbon more easily forms a benzene ring by the gathering of three acetylene-based compounds such as acetylene molecules, resulting in having a structure with high aromaticity. Further, since silver forms nanoparticles, the carbon phase after removing silver therefrom has a porous structure.

The heating of the silver acetylide can be performed, for example, as follows. The resulting precipitates of the silver acetylide are heated under a reduced pressure atmosphere, at a temperature of, for example, from 40° C. to 100° C. This heating enables to remove a solvent remaining in the silver acetylide, to prevent the thermal energy of the explosion from being consumed by sensible heat upon phase transition of the solvent into a gas phase, and to improve the efficiency of the decomposition of the silver acetylide. It is noted that the silver acetylide does not decompose at this temperature (this heat treatment is referred to as "first heat treatment" in the present disclosure).

Subsequently, the thus formed carbon material intermediate is heated, for example, at a temperature of from 140° C. to 400° C. By heating the silver acetylide to such a relatively high temperature, the silver acetylide explodes at nanoscale to decompose, and silver and carbon each form a nanostructure. In this manner, a composite material containing silver and carbon can be obtained.

The basic structure of the carbon phase portion of this composite material is formed through the formation of a polycyclic aromatic ring by the acetylene-based compounds, as described above, and is mainly composed of several layers of graphene. Since silver forms nanoscale particles in the process of explosion, in the above described composite material, the carbon material from which the silver particles have been removed has a large specific surface area, and a highly porous structure (this heat treatment is referred to as "second heat treatment" in the present disclosure).

(Silver Removal Step)

Next, the carbon material intermediate is brought into contact with a dilute nitric acid, to remove silver from the carbon material intermediate.

The dilute nitric acid to be used is, for example, an aqueous solution of dilute nitric acid having a concentration of from 5 to 30% by mass. The treatment with the dilute nitric acid is carried out, for example, at a liquid temperature of from 15 to 60° C., and for a treatment time of from 0.5 to 2 hours.

(Cleaning Treatment Step)

Next, the carbon material intermediate from which silver has been removed is brought into contact with an oxidizing agent solution, to clean the carbon material intermediate.

When the carbon material intermediate from which silver has been removed is brought into contact with a predetermined oxidizing agent solution, the carbon with low aromaticity (soot) can be selectively and efficiently removed.

As the predetermined oxidizing agent solution, at least one selected from the group consisting of a permanganate solution and a hydrogen peroxide solution is used, because of having a high oxidizing power.

The permanganate solution to be used is, for example, a 1N aqueous potassium permanganate solution, a 1N aqueous sodium permanganate solution, or the like.

The hydrogen peroxide solution to be used is, for example, a hydrogen peroxide solution having a concentration of from 15 to 60% by mass.

In the case of using a permanganate solution, the treatment with a predetermined oxidizing agent solution is carried out at a liquid temperature of from 25 to 80° C., and for a treatment time of from 2 to 5 hours; whereas in the case of using a hydrogen peroxide solution, the treatment is carried out, for example, at a liquid temperature of from 60 to 108° C. (boiling point) or higher, and for a treatment time of from 1 to 24 hours.

When a permanganate solution is used, however, it is necessary to remove manganese produced after the treatment, by a separate acid cleaning or the like. Accordingly, it is more preferred to use an aqueous hydrogen peroxide solution, which does not require an acid treatment or the like for removing metal, in the treatment with a predetermined oxidizing agent solution.

(Heat Treatment Step)

The carbon material intermediate cleaned in the above described cleaning treatment step is heat-treated at a temperature of from 1,400 to 2,200° C., preferably from 1,800 to 2,100° C., in a vacuum or in an inert gas atmosphere, to obtain a carbon material for a catalyst carrier. The heat treatment to be carried out in the present step allows the crystals of the carbon material for a catalyst carrier to develop. The crystallinity of the carbon material for a catalyst carrier can be adjusted and controlled by controlling the temperature. In a case in which the carbon material for a catalyst carrier is used as a catalyst carrier in an electrode of a polymer electrolyte fuel cell, the carbon material is exposed to an environment of: a relatively high temperature, for example, a temperature of about 80° C.; a strong acidity of pH of 1 or less; and a high potential of 1.3V vs SHE. In such an environment, carbon in the carbon material which is porous is susceptible to oxidation consumption. Accordingly, in the case of using the carbon material which is porous, as a catalyst carrier, it is deemed important to enhance the crystallinity in the present step (this heat treatment step is referred to as "third heat treatment" in the present disclosure).

The carbon with low aromaticity (soot) has a low melting temperature, and thus assumed to be an easily graphitizable carbon, which is easily graphitized. In many of easily graphitizable carbons, it is known that the graphitization progresses rapidly from the vicinity of 2,000° C. [Norio Iwashita, Introduction to Carbon Materials, Revised Edition (edited by the carbon society of Japan) (1996), pp. 24-31.], and it is assumed that the carbon with low aromaticity (soot) shows the same crystallization behavior. Therefore, the temperature of the heat treatment step is preferably 2,200° C. or lower, and more preferably 2,100° C. or lower. When the temperature of the heat treatment step is higher than 2,200° C., a rapid crystallization initiates in the carbon with high aromaticity, as well. As a result, the edges of the carbon net plane are decreased, possibly resulting in the deterioration of the support properties for supporting a catalyst. The lower limit of the temperature of the heat treatment step needs to be 1,400° C. or higher, from the viewpoint of improving the durability (the above described $\Delta G$) of the resulting carbon material for a catalyst carrier. The lower limit of the temperature of the heat treatment step is preferably 1,800° C. or higher.

In the heat treatment step, the heat treatment is retained for a retention time of preferably from 0.5 to 10 hours, and more preferably from 1 to 8 hours, from the viewpoint of reducing the crystallization of the carbon with high aromaticity and improving the durability of the carbon material for a catalyst carrier.

The heat treatment step can be carried out, for example, in a reduced pressure atmosphere or an inert gas atmosphere, and preferably in an inert gas atmosphere, but not particularly limited thereto. The inert gas to be used is not particularly limited, and nitrogen, argon or the like can be used, for example.

The carbon material for a catalyst carrier according to the present disclosure, as a catalyst carrier, is preferably composed of a dendritic carbon nanostructure having a three-dimensional dendritic structure in which a rod-shaped body or an annular body is three-dimensionally branched. This carbon material for a catalyst carrier is not only one which has the same or a better BET specific surface area and durability as compared to a conventional dendritic carbon nanostructure of this kind, but also one from which a highly crystalline and non-porous graphitized product that is thought to interfere with the dispersibility (uniformity) of the catalyst metal has been removed as much as possible, as described above. Therefore, in the catalyst layers formed using this dendritic carbon nanostructure as the catalyst carrier, micropores suitable for diffusing reaction gases without resistance and discharging water (produced water) produced in the catalyst layers without delay are formed, and the utilization ratio of the catalyst metal is less likely to be decreased. As a result, a polymer electrolyte fuel cell having an excellent durability as a fuel cell can be obtained.

The "dendritic carbon nanostructure" as used herein refers, for example, to a dendritic structure in which branches having a branch diameter of from 10 nm to several hundred nanometers (for example, 500 nm or less (preferably 200 nm or less)) are formed.

The branch diameter is measured as follows. SEM images captured at a magnification of 100,000 times in 5 fields of view (each having a size of 2.5 μm×2 μm), using a scanning electron microscope (SEM; SU-9000, manufactured by Hitachi High-Tech Corporation) are observed. Then, the branch diameter is measured at 20 locations on the image in each field of view, and the mean value of the measured values at the total of 100 locations is defined as the branch diameter. The branch diameter is determined by measuring the branch diameter of a central portion between two adjacent branching points (namely, an intermediate portion between the branching points) (see FIG. 4A; in FIG. 4A, each D represents the branch diameter), on a branch to be focused.

Figure 5:
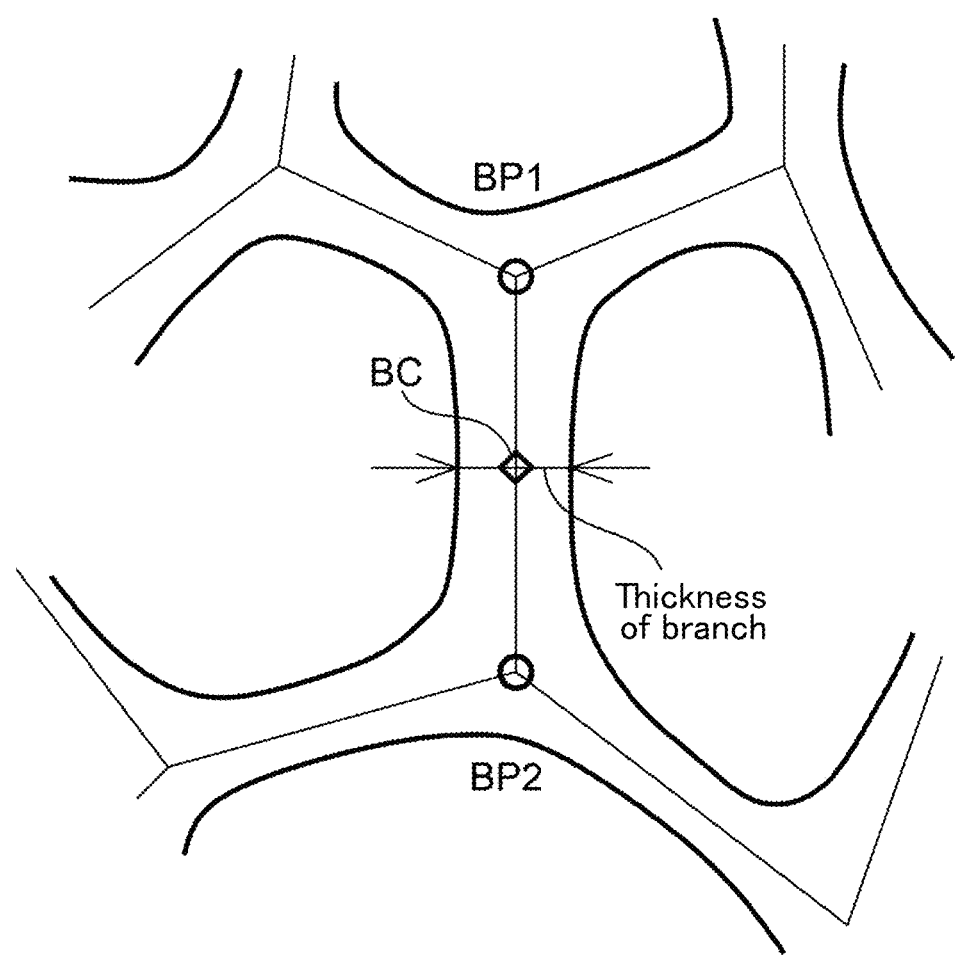
FIG. 5 is an explanatory diagram showing a method of measuring a branch diameter of a carbon material for a catalyst carrier according to the present disclosure.

The method of measuring the branch diameter will be described with reference to FIG. 5. FIG. 5 shows a branch at one location being focused. In the branch being focused, a branching point BP1 and a branching point BP2 are specified. Next, the thus specified branching point BP1 and branching point BP2 are connected, and the thickness (width) of the branch is measured at the position of a perpendicular bisector BC of a line connecting between the branching point BP1 and the branching point BP2. The thus measured thickness (width) of the branch is the branch diameter D per one location.

EXAMPLES

The carbon material for a catalyst carrier according to the present disclosure and the production method thereof will now be specifically described based on Experimental Examples.

The thermogravimetric analysis [the measurements of the intensity ratio ($I_{750}/I_{peak}$), and the residual weight ratio (%) of the graphitized product], and the measurements of the BET specific surface area (m$^2$/g), the integrated pore volume $V_{2-10}$ of a pore diameter of from 2 to 10 nm, the nitrogen gas adsorption amount $V_{macro}$ [cc(STP)/g], the half width $\Delta G$ (cm$^{-1}$) of the G-band detected in a range of from 1,550 to 1,650 cm$^{-1}$ in a Raman spectroscopic spectrum and the yield (%), of the carbon material for a catalyst carrier prepared in each of the following Experimental Examples, were carried out as follows. Further, some of the resulting carbon materials for a catalyst carrier were observed using a transmission electron microscope (TEM) and a scanning electron microscope (SEM).

<Measurements of Intensity Ratio ($I_{750}/I_{peak}$) and Residual Weight Ratio (%) by Thermogravimetric Analysis>

About 6 mg of the carbon material for a catalyst carrier prepared in each of the Experimental Examples to be described later was weighed, as a sample. Thereafter, each sample was set on a thermogravimetric/differential thermal analyzer (EXSTAR TG/DTA 7200, manufactured by Hitachi High-Technologies Corporation), and the weight loss up to 900° C. was measured, at a temperature rise rate of 10° C./min and under a stream of dry air at a rate of 200 mL/min. The resulting weight loss curve was differentiated over time to obtain a derivative thermogravimetric curve (DTG). The peak intensity ($I_{peak}$) of the peak appearing in the vicinity of 690° C. and the intensity ($I_{750}$) at 750° C. in the thus obtained DTG were measured, and the intensity ratio ($I_{750}/I_{peak}$) thereof was calculated.

The residual weight ratio (%) of the graphitized product was determined, focusing on the residual weight of the graphitized product at 750° C. in the thermogravimetric analysis (TGA). Specifically, the thermogravimetric analysis (TGA) under the above described conditions is performed, and the relationship with the incorporation amount (residual weight ratio) of the graphitized product is determined by the thermogravimetric analysis (TGA), as shown in FIG. 2B. More specifically, a graph having an ordinate in which the residual weight ratio at 300° C. in the TGA spectrum was taken as 100%, and the residual weight ratio at 900° C. therein was taken as 0%, was prepared, and the residual weight ratio (%) of the graphitized product at 750° C. in the thermogravimetric analysis (TGA) was determined from the value of the ordinate at 750° C. in the graph.

The reason for taking the residual weight ratio at 300° C. as 100% is as follows. In a case in which the carbon material for a catalyst carrier (porous carbon material) has absorbed water, the discharge of the absorbed water takes place up to a temperature of 200° C., and therefore, the value at 300° C. represents the true amount of the sample of the carbon material for a catalyst carrier (porous carbon material).

<Measurements of BET Specific Surface Area ($m^2/g$), Integrated Pore Volume $V_{2-10}$ of Pore Diameter of from 2 to 10 nm, and Nitrogen Gas Adsorption Amount $V_{Macro}$ [cc (STP)/g]>

About 30 mg of the carbon material for a catalyst carrier prepared in each of the Experimental Examples to be described later was weighed, as a sample, and dried in vacuum at 200° C. for 2 hours. Thereafter, the measurement was carried out using an automatic specific surface area measuring apparatus (AUTOSORB I-MP; manufactured by Quantachrome Instruments Japan G. K.), and using nitrogen gas as an adsorbent, to obtain a nitrogen gas adsorption isotherm. The BET analysis of the isotherm was carried out in the range in which the relative pressure of the isotherm during adsorption is from 0.05 to 0.15, and the BET specific surface area was calculated.

Further, the integrated pore volume $V_{2-10}$ of a pore diameter of from 2 to 10 nm was calculated, using the same nitrogen gas adsorption isotherm as obtained above, and by analyzing the isotherm by the Dollimore-Heal method (DH method) using accompanying software.

In addition, the nitrogen gas adsorption amount $V_{macro}$ [cc(STP)/g] was determined by calculating the difference between the adsorption amount [cc(STP)/g] at a relative pressure of 0.95, and the adsorption amount [cc(STP)/g] at a relative pressure of 0.99, in the same nitrogen gas adsorption isotherm as obtained above.

<Half Width ΔG ($cm^{-1}$) of G-band Detected in Range of from 1,550 to 1,650 $cm^{-1}$ in Raman Spectroscopic Spectrum>

About 3 mg of the carbon material for a catalyst carrier prepared in each of the Experimental Examples to be described later was weighed, as a sample. Thereafter, the sample was set to a Laser Raman spectrophotometer (Model NRS-3100, manufactured by JASCO Corporation), and the measurement was carried out under the following conditions: excitation laser: 532 nm, laser power: 10 mW (sample irradiation power: 1.1 mW), microscopic arrangement: Backscattering, slit: 100 μm×100 μm, objective lens: 100 times, spot diameter: 1 μm, exposure time: 30 sec, observation wave number: from 2,000 to 300 $cm^{-1}$, and cumulative number: 6 times. Then, the half width ΔG ($cm^{-1}$) of the so-called G-band of the graphite, which appears in the vicinity of 1,580 $cm^{-1}$, was determined from each of the six resulting spectra, and the mean value thereof was taken as the measured value.

<TEM Observation>

In order to observe the state of a crystallization product, an observation was carried out using a transmission electron microscope, and using the carbon material for a catalyst carrier prepared in Experimental Example 27 as a sample. The result is shown in FIG. 1.

<SEM Observation>

Figure 4A:
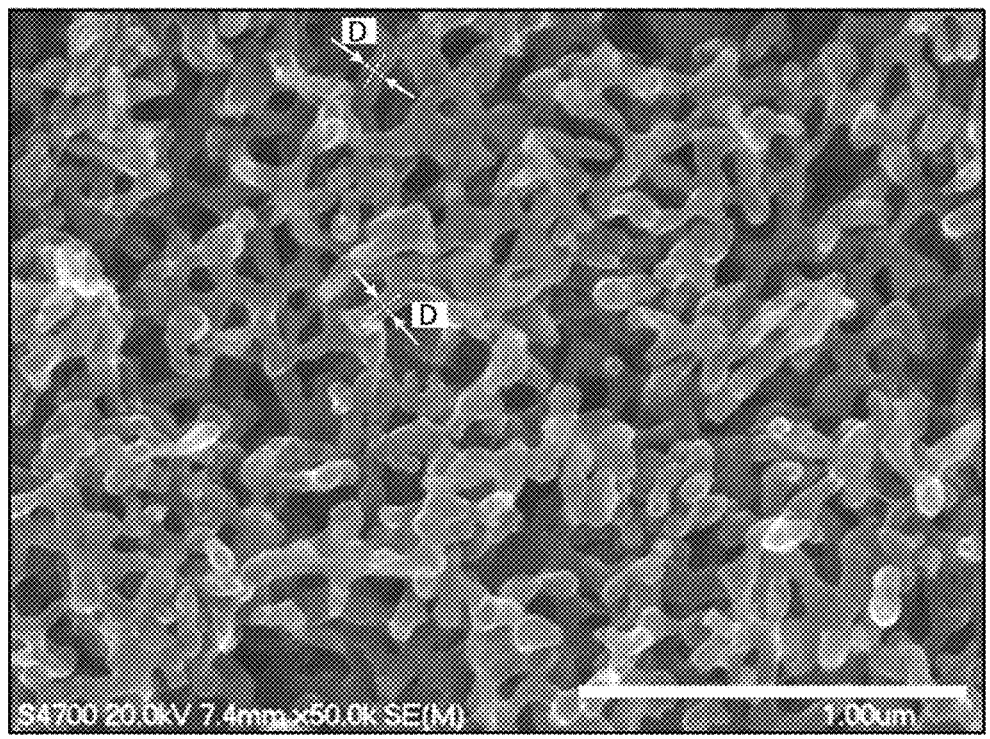
FIG. 4A is an explanatory diagram (image) for showing a dendritic structure confirmed by SEM observation of a carbon material for a catalyst carrier of Experimental Example 1 (the bar shown at the lower left side indicates 1 μm).
Figure 4B:
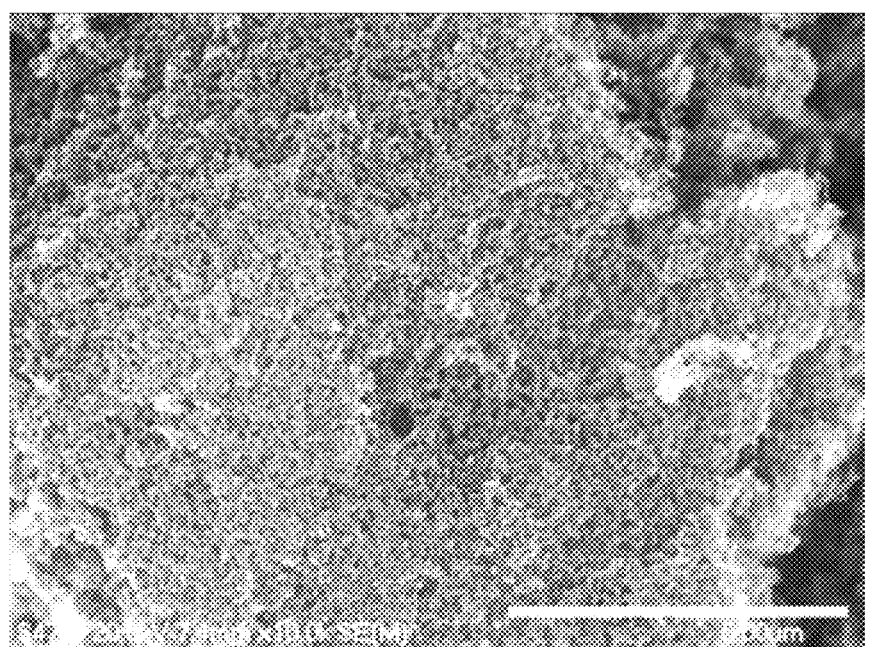
FIG. 4B is an explanatory diagram (image) for showing the dendritic structure which is confirmed by SEM observation of the carbon material for a catalyst carrier of Experimental Example 1 (the bar shown at the lower left side indicates 5 μm).

In order to observe the state of the dendritic structure, an observation was carried out using a high-resolution scanning electron microscope, and using the carbon material for a catalyst carrier prepared in Experimental Example 1 as a sample. The result is shown in FIG. 4A and FIG. 4B.

Experimental Example 1

(1) Silver Acetylide Production Step

A quantity of 110 g of a 25% by mass aqueous ammonia solution was added to 25 g of silver nitrate to dissolve the silver nitrate, and 110 g of water was further added thereto. Thereafter, dry nitrogen was blown into the resultant to remove residual oxygen. Subsequently, while stirring the resulting solution and vibrating the solution with an ultrasonic oscillator immersed therein, an acetylene gas was blown into the solution at a flow rate of 73.5 mL/min for 22 minutes. In this manner, solids of silver acetylide were allowed to precipitate in the solution. Thereafter, the resulting precipitates were filtered with a membrane filter. During the filtration, the precipitates were washed with methanol, and a small amount of methanol was further added to impregnate precipitates with methanol.

(2) Decomposition Step

About 0.5 g of the silver acetylide of each of the Experimental Examples, obtained in the above described silver acetylide production step, was charged into a cylindrical container made of stainless steel and having a diameter of 5 cm, as it is, in the state impregnated with methanol. The container was placed in a vacuum dryer, and dried in vacuum at 60° C. over a period of time from about 15 to 30 minutes, to prepare a silver particle-encapsulated intermediate, in which particles derived from the silver acetylide are encapsulated (first heat treatment).

Subsequently, the silver particle-encapsulated intermediate at 60° C. immediately after the vacuum drying, which had been obtained in the first heat treatment step, was further heated rapidly to 200° C., as it is and without being taken out from the vacuum electric heating furnace, and heating was carried out for 20 minutes (second heat treatment). During the heating process, a nanoscale explosion reaction occurred inside the container, to cause the encapsulated silver to gush out. As a result, a silver-encapsulated nanostructure (carbon material intermediate) on the surface and the interior of which numerous blowout pores had been formed, was obtained as a composite material containing silver and carbon.

(3) Silver Removal Step

A quantity of 10 g of the carbon material intermediate composed of the composite material of silver and carbon, which had been obtained in the second heat treatment, was immersed in 150 g of a dilute nitric acid having a concentration of 15% by mass (liquid temperature: 30° C.) for 1 hour. Subsequently, nitric acid was removed using a centrifuge. Further, in order to sufficiently remove the remaining nitric acid, the carbon material intermediate after the centrifugation was dispersed again in pure water, and then centrifuged again to separate the carbon material intermediate (solids) from liquid. Such a water washing operation was repeated twice, to obtain a carbon material intermediate from which silver had been removed by removing nitric acid.

(4) Cleaning Treatment Step

A quantity of 150 g of a 30% by mass hydrogen peroxide solution was added to the carbon material intermediate from which silver had been removed, and the resultant was treated at a treatment temperature (liquid temperature) of 60° C. under a nitrogen gas stream for 4 hours, to remove the remaining carbon with low aromaticity (soot) and the like, thereby obtaining a cleaned carbon material intermediate. The cleaned carbon material intermediate was dried by treating at 140° C. under an air atmosphere for 2 hours to remove moisture. Thereafter, the intermediate was heat-treated at 1,100° C. under an argon stream for 2 hours, to obtain a porous carbon material.

(5) Heat Treatment Step (Third Heat Treatment)

The porous carbon material obtained in the above (4) was further heated to 2,100° C. at a rate of 15° C./min, under an argon stream. After reaching a predetermined temperature, the carbon material was maintained at that temperature for 2 hours to perform a heat treatment, to obtain a carbon material for a catalyst carrier according to Experimental Example 1.

For the thus prepared carbon material for a catalyst carrier of Experimental Example 1, the thermogravimetric analysis [the measurements of the intensity ratio ($I_{750}/I_{peak}$) and the residual weight ratio (%)], and the measurements of the BET specific surface area (m$^2$/g), the integrated pore volume $V_{2-10}$ of a pore diameter of from 2 to 10 nm, the nitrogen gas adsorption amount $V_{macro}$ [cc(STP)/g] and the half width ΔG of the G-band detected in a range of from 1,550 to 1,650 cm$^{-1}$ in a Raman spectroscopic spectrum (cm$^{-1}$), were carried out.

The results are shown in Table 1.

Experimental Examples 2 to 5

Carbon materials for a catalyst carrier were prepared and evaluated in the same manner as in Experimental Example 1, except that, in the heat treatment step (third heat treatment), the retention temperatures were changed to 2,000° C., 1,900° C., 1,800° C. and 2,200° C., respectively. The results are shown in Table 1.

Experimental Examples 6 and 7

Carbon materials for a catalyst carrier were prepared and evaluated in the same manner as in Experimental Example 1, except that, in the cleaning treatment step, the treatment times were changed to 2 hours and 8 hours, respectively. The results are shown in Table 1.

Experimental Examples 8 and 9

Carbon materials for a catalyst carrier were prepared and evaluated in the same manner as in Experimental Example 1, except that, in the cleaning treatment step, the treatment times were each changed to 8 hours, and in the heat treatment step (third heat treatment), the retention temperatures therein were changed to 1,800° C. and 2,200° C., respectively. The results are shown in Table 1.

Experimental Example 10

A carbon material for a catalyst carrier was prepared and evaluated in the same manner as in Experimental Example 1, except that the concentration of the hydrogen peroxide solution in the cleaning treatment step was changed to 35% by mass. The results are shown in Table 1.

Experimental Examples 11 and 12

Carbon materials for a catalyst carrier were prepared and evaluated in the same manner as in Experimental Example 1, except that, in the cleaning treatment step, the concentrations of the hydrogen peroxide solution were each changed to 35% by mass, and in the heat treatment step (third heat treatment), the retention temperatures therein were changed to 1,800° C. and 2,200° C., respectively. The results are shown in Table 1.

Experimental Example 13

A carbon material for a catalyst carrier was prepared and evaluated in the same manner as in Experimental Example 1, except that the concentration of the hydrogen peroxide solution in the cleaning treatment step was changed to 15% by mass. The results are shown in Table 1.

Experimental Examples 14 and 15

Carbon materials for a catalyst carrier were prepared and evaluated in the same manner as in Experimental Example 1, except that, in the cleaning treatment step, the concentrations of the hydrogen peroxide solution were each changed to 15% by mass, and the treatment times therein were changed to 8 hours and 24 hours, respectively. The results are shown in Table 1.

Experimental Examples 16 to 19

Carbon materials for a catalyst carrier were prepared and evaluated in the same manner as in Experimental Example 1, except that, in the cleaning treatment step, the concentrations of the hydrogen peroxide solution were each changed to 35% by mass, the treatment temperatures (liquid temperatures) therein were each changed to 108° C. (boiling point), and the treatment times therein were changed to 2 hours, 4 hours, 8 hours and 24 hours, respectively. The results are shown in Table 1.

Experimental Example 20

A carbon material for a catalyst carrier was prepared and evaluated in the same manner as in Experimental Example 1, except that the concentration of the hydrogen peroxide solution in the cleaning treatment step was changed to 15% by mass, and the retention temperature in the heat treatment step (third heat treatment) was changed to 2,200° C. The results are shown in Table 1.

Experimental Examples 21 and 22

Carbon materials for a catalyst carrier were prepared and evaluated in the same manner as in Experimental Example 1, except that, in the heat treatment step (third heat treatment), the retention temperatures were changed to 1,700° C. and 1,500° C., respectively. The results are shown in Table 1.

Experimental Examples 23 and 24

Carbon materials for a catalyst carrier were prepared and evaluated in the same manner as in Experimental Example 1, except that, in the heat treatment step (third heat treatment), the retention temperatures were changed to 2,300° C. and 2,500° C., respectively. The results are shown in Table 2.

Experimental Examples 25 and 26

Carbon materials for a catalyst carrier were prepared and evaluated in the same manner as in Experimental Example 1, except that, in the cleaning treatment step, the concentrations of the hydrogen peroxide solution were each changed to 60% by mass, the treatment temperatures (liquid temperatures) therein were each changed to 108° C. (reflux condition), and the treatment times therein were each changed to 2 hours, and that, in the heat treatment step (third heat treatment), the retention temperatures were changed to 1,300° C. and 1,100° C., respectively. The results are shown in Table 2.

Experimental Examples 27 and 28

Carbon materials for a catalyst carrier were prepared and evaluated in the same manner as in Experimental Example 1, except that, in the heat treatment step (third heat treatment), the retention times were changed to 1 hour and 4 hours, respectively. The results are shown in Table 2.

Experimental Example 29

A carbon material for a catalyst carrier was prepared and evaluated in the same manner as in Experimental Example 1, except that the silver removal step and the cleaning treatment step were changed to a nitric acid treatment step, as described below. The results are shown in Table 3.
<Nitric Acid Treatment Step>

A quantity of 10 g of the carbon material intermediate composed of the composite material of silver and carbon, which had been obtained in the second heat treatment, was immersed in 150 g of a concentrated nitric acid having a concentration of 60% by mass, and cleaned at a treatment temperature (liquid temperature) of 90° C. under a nitrogen gas stream for 2 hours, to remove the remaining silver particles, the carbon with low aromaticity (soot) and the like. Subsequently, the concentrated nitric acid was removed using a centrifuge, from the carbon material intermediate after the cleaning. Further, in order to sufficiently remove the remaining concentrated nitric acid, the carbon material intermediate after the centrifugation was dispersed again in pure water, and then centrifuged again to separate the carbon material intermediate (solids) from liquid. Such a water washing operation was repeated twice, to obtain a cleaned carbon material intermediate from which the concentrated nitric acid had been removed.

The cleaned carbon material intermediate was dried by treating at 140° C. under an air atmosphere for 2 hours to remove moisture. Thereafter, the intermediate was heat-treated at 2,100° C. under an argon stream for 2 hours, to obtain a porous carbon material.

Experimental Example 30

A carbon material for a catalyst carrier was prepared and evaluated in the same manner as in Experimental Example 29, except that, in the nitric acid treatment step, the concentration of nitric acid was changed to 30% by mass, and the treatment temperature (liquid temperature) was changed to 60° C. The results are shown in Table 3.

Experimental Example 31

A carbon material for a catalyst carrier was prepared and evaluated in the same manner as in Experimental Example 1, except that the cleaning treatment step was changed to an aqueous potassium permanganate solution treatment, as described below. The results are shown in Table 4.
<Aqueous Potassium Permanganate Solution Treatment>

A quantity of 10 g of the carbon material intermediate composed of the composite material of silver and carbon, which had been obtained in the second heat treatment, was immersed in 150 g of a dilute nitric acid having a concentration of 15% by mass, at 30° C. for 1 hour. Subsequently, nitric acid was removed using a centrifuge. Further, in order to sufficiently remove the remaining nitric acid, the carbon material intermediate after the centrifugation was dispersed again in pure water, and then centrifuged again to separate the carbon material intermediate (solids) from liquid. Such a water washing operation was repeated twice, to obtain a carbon material intermediate from which silver had been removed by removing nitric acid. Further, 150 g of a 0.4 N aqueous potassium permanganate solution was added to the carbon material intermediate from which silver had been removed, and the resultant was treated at a treatment temperature (liquid temperature) of 80° C. under a nitrogen gas stream for 4 hours, to remove the remaining carbon with low aromaticity (soot) and the like.

Thereafter, the aqueous potassium permanganate solution was removed from the carbon material intermediate, using a centrifuge. Further, in order to sufficiently remove the remaining aqueous potassium permanganate solution, the carbon material intermediate after the centrifugation was dispersed again in pure water, and then centrifuged again to separate the carbon material intermediate (solids) from liquid. Such a water washing operation was repeated twice, to remove the aqueous potassium permanganate solution.

Since there is a possibility that manganese dioxide is remaining in the carbon material intermediate after the removal of the aqueous potassium permanganate solution, 100 g of 1N hydrochloric acid was added to the carbon material intermediate after the removal of the aqueous potassium permanganate solution, and the carbon material intermediate (solids) was separated from liquid, using a centrifuge. The carbon material intermediate after the centrifugation was dispersed again in pure water, and then centrifuged again to separate the carbon material intermediate (solids) from liquid. Such a water washing operation was repeated twice, to obtain a cleaned carbon material intermediate. The cleaned carbon material intermediate was dried by treating at 140° C. under an air atmosphere for 2 hours to remove moisture. Thereafter, the intermediate was heat-treated at 2,100° C. under an argon stream for 2 hours, to obtain a porous carbon material.

Experimental Example 32

A carbon material for a catalyst carrier was prepared and evaluated in the same manner as in Experimental Example 31, except that the treatment time for treating with the aqueous potassium permanganate solution in the aqueous permanganate solution treatment step was changed to 2 hours. The results are shown in Table 4.

Experimental Example 33

A carbon material for a catalyst carrier was prepared and evaluated in the same manner as in Experimental Example 31, except that, in the aqueous permanganate solution treatment step, the concentration of the aqueous potassium permanganate solution was changed to 1.0 N, the treatment temperature was changed to 60° C., and the treatment time was changed to 3 hours. The results are shown in Table 4.

Experimental Example 34

A carbon material for a catalyst carrier was prepared and evaluated in the same manner as in Experimental Example 31, except that, in the aqueous permanganate solution treatment step, the concentration of the aqueous potassium permanganate solution was changed to 3.0 N, the treatment temperature was changed to 40° C., and the treatment time was changed to 5 hours. The results are shown in Table 4.

Experimental Example 35

A commercially available porous carbon material was examined, as each of Experimental Examples 35 to 37. The results are shown in Table 5.

As the commercially available porous carbon material, Ketjen Black EC600-JD, manufactured by Lion Corporation, which is a porous carbon having a dendritic structure, developed pores and a large specific surface area, was used. The carbon material was heated to 1,400° C. at a rate of 15° C./min, under an argon stream. After reaching a predetermined temperature, the carbon material was maintained at that temperature for 2 hours to perform a heat treatment, to obtain a carbon material for a catalyst carrier according to Experimental Example 35.

Experimental Examples 36 and 37

Carbon materials for a catalyst carrier were prepared in the same manner as in Experimental Example 35, except that, in the heat treatment, the retention temperatures were changed to 1,700° C. and 2,000° C., respectively.

Experimental Example 38

A carbon material for a catalyst carrier was prepared and evaluated in the same manner as in Experimental Example 1, except that the vacuum drying time in the decomposition step was changed to 2 hours. The results are shown in Table 6.

Experimental Examples 39 and 40

Carbon materials for a catalyst carrier were prepared and evaluated in the same manner as in Experimental Example 1, except that, in the decomposition step, the vacuum drying times were each changed to 2 hours, and in the heat treatment step (third heat treatment), the retention temperatures therein were changed to 1,800° C. and 1,100° C., respectively. The results are shown in Table 6.

<Preparation of Catalyst, Preparation of Catalyst Layer, and Evaluation of Support Properties for Supporting Catalyst Metal<

Next, each of the carbon materials for a catalyst carrier prepared as described above was used to prepare a catalyst for a polymer electrolyte fuel cell on which a catalyst metal is supported, as described below, and the support properties for supporting the catalyst metal, of each resulting catalyst, was evaluated. Further, each resulting catalyst was used to prepare a catalyst layer ink liquid, the catalyst layer ink liquid was used to form catalyst layers, and the thus formed catalyst layers were used to prepare a membrane electrode assembly (MEA). Each of the thus prepared MEAs was incorporated into a fuel cell, and a power generation test was carried out using a fuel cell measuring apparatus. The preparation of respective members and the evaluation of each cell by the power generation test will now be described in detail.

(1) Preparation of Catalyst for Polymer Electrolyte Fuel Cell (Platinum-Supported Carbon Material)

Each of the carbon materials for a catalyst carrier prepared above was dispersed in distilled water, formaldehyde was added to the resulting dispersion liquid, and the resultant was set to a water bath controlled to 40° C. After the temperature of the dispersion liquid had reached 40° C., which is the same temperature as that of the bath, an aqueous nitric acid solution of dinitrodiamine-Pt complex was slowly poured into the dispersion liquid, under stirring. After continuing to stir for about 2 hours, the dispersion liquid was filtered, and the resulting solids were washed. The thus obtained solids were dried in vacuum at 90° C., crushed in a mortar, and then heat-treated at 200° C. for 1 hour, in an argon atmosphere containing 5% by volume of hydrogen, to prepare a platinum catalyst particle-supported carbon material, for each Experimental Example. The amount of supported platinum of each platinum-supported carbon material was adjusted to 40% by mass with respect to the total mass of the carbon material for a catalyst carrier and platinum particles, and confirmed by measuring by inductively coupled plasma-atomic emission spectrometry (ICP-AES).

The average particle size of the platinum particles was estimated using an X-ray diffraction apparatus (RINT TTR III, manufactured by Rigaku Corporation), from the half width of the (111) peak of platinum in a powder X-ray diffraction spectrum of the resulting catalyst, in accordance with Scherrer equation.

(2) Evaluation of Support Properties for Supporting Catalyst Metal (Measurement of Rate of Increase in Average Particle Size)

Each of the platinum catalyst particle-supported carbon materials prepared above was maintained at 600° C. for 2 hours in an argon flow, followed by cooling. Thereafter, the average particle size of the platinum catalyst particles supported on each carbon material was measured again by a powder X-ray diffraction measurement, the rate of increase (%) in the particle size was calculated, and the evaluation was carried out in accordance with the following criteria. The results are shown in Table 1 to Table 6.

[Acceptable Rank]
    A: Those in which the rate of increase in the particle size is 200% or less.
[Unacceptable Rank]
    C: Those in which the rate of increase in the particle size is more than 200%.

<Preparation of Catalyst Layer, Preparation of MEA, Assembly of Fuel Cell, and Evaluation of Battery Performance (Durability)>

(1) Preparation of Catalyst Layer

Using each platinum-supported carbon material (Pt catalyst) prepared as described above, and using NAFION (registered trademark; a persulfonic acid-based ion exchange resin) manufactured by Dupont Inc. as an electrolyte resin, the Pt catalyst and NAFION were mixed in an Ar atmosphere such that the mass of the solid content of NAFION is 1.0 times with respect to the mass of the platinum catalyst particle-supported carbon material, and is 0.5 times with respect to the mass of non-porous carbon. After stirring lightly, the Pt catalyst was cracked by ultrasonics, and ethanol was further added to the mixture so that the total solid concentration of the Pt catalyst and the electrolyte resin was adjusted to 1.0% by mass, to prepare a catalyst layer ink liquid in which the Pt catalyst and the electrolyte resin were mixed.

Ethanol was further added to each catalyst layer ink liquid that was prepared as described above and that had a solid concentration of 1.0% by mass, to prepare a catalyst layer ink liquid for spray coating, having a platinum concentration of 0.5% by mass. The resulting catalyst layer ink liquid for spray coating was sprayed on TEFLON (registered trademark) sheets, while adjusting spray conditions such that the mass of platinum per unit area of each catalyst layer (hereinafter, referred to as "platinum areal weight") was 0.2 mg/cm$^2$, followed by a drying treatment in argon at 120° C. for 60 minutes, to prepare catalyst layers.

(2) Preparation of MEA

Using the catalyst layers prepared as described above, each MEA (membrane electrode composite) was prepared by the following method.

An electrolyte membrane in the shape of a 6 cm×6 cm square was cut out from a NAFION membrane (NR211; manufactured by Dupont Inc.). Further, the anode and cathode catalyst layers which had been coated on TEFLON (registered trademark) sheets were each cut out in the shape of a 2.5 cm×2.5 cm square, using a cutter knife.

The electrolyte membrane was sandwiched between the thus cut-out anode and cathode catalyst layers, such that the central portion of the electrolyte membrane was sandwiched between the respective catalyst layers so as to be in contact with each catalyst layer, and that the positions thereof were not displaced relative to each other. The resultant was pressed at 120° C. and at 100 kg/cm$^2$ for 10 minutes, and then cooled to room temperature. Thereafter, the TEFLON sheets alone were carefully peeled off from both the anode and the cathode sides, to prepare a catalyst layer-electrolyte membrane composite in which the anode and cathode catalyst layers were each fixed on the electrolyte membrane.

Subsequently, from a carbon paper (35BC; manufactured by SGL carbon SE), a pair of carbon papers each in the shape of a 2.5 cm×2.5 cm square were cut out, as gas diffusion layers, and the catalyst layer-electrolyte membrane composite was sandwiched between these carbon papers such that the positions of the carbon papers coincided with those of the anode and cathode catalyst layers, and were not displaced relative to each other. The resultant was pressed at 120° C. and at 50 kg/cm$^2$ for 10 minutes, to obtain an MEA.

The areal weight of each of the components of the catalyst metal, the carbon material and the electrolyte material, in each of the thus prepared MEAs, was obtained by: determining the mass of the catalyst layers fixed on the NAFION membrane (electrolyte membrane), from the difference between the mass of the TEFLON sheets with catalyst layers before the pressing, and the mass of the TEFLON sheets peeled off after the pressing; and performing a calculation based on the mass ratio of the composition of the catalyst layers.

(3) Performance Evaluation of Fuel Cell (Evaluation of Power Generation Performance and Durability)

The MEA prepared using the carbon material for a catalyst carrier according to each Experimental Example was incorporated into a cell, the resulting cell was set to a fuel cell measuring apparatus, and the performance of the fuel cell was evaluated by the following procedure.

While adjusting the pressure by a back pressure valve provided at downstream of the cell, air as an oxidizing gas was supplied to the cathode side and pure hydrogen as a reaction gas was supplied to the anode side, at a back pressure of 0.05 MPa, such that the utilization ratios of respective gasses were 40% and 70%, respectively. Further, the temperature of the cell was set to 80° C., the oxidizing gas and the reaction gas to be supplied were bubbled through distilled water maintained at 60° C. in a humidifier, on both the cathode and anode sides, and the power generation performance under low humidification conditions was evaluated.

[Evaluation of Power Generation Performance]

Under the conditions where the reaction gases were supplied to the cell in such settings, the load was gradually increased, and an inter-terminal voltage of the cell at a current density of 100 mA/cm$^2$ was recorded as an output voltage. Thereafter, the performance of each fuel cell was evaluated. The evaluation was carried out in accordance with the following criteria, and categorized into Acceptable Ranks A and B, and Unacceptable Rank C. The results are shown in Table 1 to Table 6.

[Acceptable Ranks]

A: Those in which the output voltage at 100 mA/cm$^2$ is 0.86 V or more.

B: Those in which the output voltage at 100 mA/cm$^2$ is 0.84 V or more.

[Unacceptable Rank]

C: Those in which the output voltage is inferior to Acceptable Rank B.

[Evaluation of Durability]

In each of the above cells, the anode side was maintained as described above, and an argon gas under the same humidification conditions as described above was supplied to the cathode side. In this state, each cell was subjected to operation cycles, each cycle consisting of: an operation of holding the cell voltage at 0.6 V for 4 seconds; and an operation of holding the cell voltage at 1.0 V for 4 seconds (repeated operation of square wave voltage fluctuation). After performing 4,000 cycles of this repeated operation of square wave voltage fluctuation, the durability of the cell was examined, in the same manner as the evaluation of the above described large current characteristics. The evaluation was carried out in accordance with the following criteria, and categorized into Acceptable Ranks A and B, and Unacceptable Rank C. The results are shown in Table 1 to Table 6.

[Acceptable Ranks]

A: Those in which the output voltage at 100 mA/cm$^2$ is 0.86 V or more.

B: Those in which the output voltage at 100 mA/cm$^2$ is 0.84 V or more.

[Unacceptable Rank]

C: Those in which the output voltage is inferior to Acceptable Rank B.

TABLE 1

| | Cleaning treatment step | | | Third heat treatment step (° C.) | Heating retention time (h) | Carbon material for catalyst carrier | | | | | | Performance evaluation | | | |
|---|---|---|---|---|---|---|---|---|---|---|---|---|---|---|---|
| | Concentration of hydrogen peroxide solution (% by mass) | Liquid temperature (° C.) | Treatment time (hr) | | | BET (m²/g) | $V_{2-10}$ (mL/g) | $V_{macro}$ (cc/g) | ΔG (cm⁻¹) | $I_{750}/I_{peak}$ | Residual weight ratio (%) | Rate of increase in particle size | Power generation performance | Durability | Note |
| Experimental Example 1 | 30 | 60 | 4 | 2100 | 2 | 950 | 0.57 | 520 | 62 | 0.04 | 0.7 | A | B | B | E |
| Experimental Example 2 | 30 | 60 | 4 | 2000 | 2 | 1160 | 0.6 | 540 | 65 | 0.01 | 0.1 | A | A | A | E |
| Experimental Example 3 | 30 | 60 | 4 | 1900 | 2 | 1260 | 0.59 | 580 | 66 | less than 0.01 | less than 0.1 | A | A | A | E |
| Experimental Example 4 | 30 | 60 | 4 | 1800 | 2 | 1350 | 0.59 | 630 | 68 | less than 0.01 | less than 0.1 | A | A | B | E |
| Experimental Example 5 | 30 | 60 | 4 | 2200 | 2 | 760 | 0.55 | 480 | 53 | 0.08 | 1.4 | A | B | B | E |
| Experimental Example 6 | 30 | 60 | 2 | 2100 | 2 | 940 | 0.59 | 520 | 63 | 0.04 | 0.7 | A | B | B | E |
| Experimental Example 7 | 30 | 60 | 8 | 2100 | 2 | 960 | 0.58 | 520 | 65 | 0.03 | 0.7 | A | B | B | E |
| Experimental Example 8 | 30 | 60 | 8 | 1800 | 2 | 1380 | 0.59 | 610 | 68 | less than 0.01 | less than 0.1 | A | A | B | E |
| Experimental Example 9 | 30 | 60 | 8 | 2200 | 2 | 780 | 0.54 | 480 | 55 | 0.07 | 1.3 | A | B | B | E |
| Experimental Example 10 | 35 | 60 | 4 | 2100 | 2 | 960 | 0.58 | 530 | 63 | 0.04 | 0.7 | A | B | B | E |
| Experimental Example 11 | 35 | 60 | 4 | 1800 | 2 | 1350 | 0.60 | 610 | 67 | less than 0.01 | less than 0.1 | A | A | B | E |
| Experimental Example 12 | 35 | 60 | 4 | 2200 | 2 | 740 | 0.55 | 460 | 54 | 0.07 | 1.3 | A | B | B | E |
| Experimental Example 13 | 15 | 60 | 4 | 2100 | 2 | 920 | 0.56 | 500 | 63 | 0.04 | 0.7 | A | B | B | E |
| Experimental Example 14 | 15 | 60 | 8 | 2100 | 2 | 940 | 0.57 | 510 | 63 | 0.04 | 0.7 | A | B | B | E |
| Experimental Example 15 | 15 | 60 | 24 | 2100 | 2 | 950 | 0.57 | 510 | 64 | 0.04 | 0.6 | A | B | B | E |
| Experimental Example 16 | 35 | 108 | 2 | 2100 | 2 | 1030 | 0.57 | 500 | 63 | 0.04 | 0.6 | A | B | B | E |
| Experimental Example 17 | 35 | 108 | 4 | 2100 | 2 | 1050 | 0.59 | 520 | 63 | 0.04 | 0.6 | A | B | B | E |
| Experimental Example 18 | 35 | 108 | 8 | 2100 | 2 | 1020 | 0.56 | 500 | 64 | 0.04 | 0.6 | A | B | B | E |
| Experimental Example 19 | 35 | 108 | 24 | 2100 | 2 | 1050 | 0.58 | 530 | 63 | 0.07 | 0.7 | A | B | B | E |
| Experimental Example 20 | 15 | 60 | 4 | 2200 | 2 | 850 | 0.55 | 480 | 54 | 0.07 | 1.6 | A | B | B | E |
| Experimental Example 21 | 30 | 60 | 4 | 1700 | 2 | 1400 | 0.61 | 810 | 72 | 0.00 | 0.0 | A | A | B | E |
| Experimental Example 22 | 30 | 60 | 4 | 1500 | 2 | 1450 | 0.63 | 920 | 73 | 0.00 | 0.0 | A | A | B | E |

TABLE 2

| | Cleaning treatment step | | | Third heat treatment step (° C.) | Heating retention time (h) | Carbon material for catalyst carrier | | | | | | Performance evaluation | | | |
|---|---|---|---|---|---|---|---|---|---|---|---|---|---|---|---|
| | Concentration of hydrogen peroxide solution (% by mass) | Liquid temperature (° C.) | Treatment time (hr) | | | BET (m²/g) | $V_{2-10}$ (mL/g) | $V_{macro}$ (cc/g) | ΔG (cm⁻¹) | $I_{750}/I_{peak}$ | Residual weight ratio (%) | Rate of increase in particle size | Power generation performance | Durability | Note |
| Experimental Example 23 | 30 | 60 | 4 | 2300 | 2 | 380 | 0.51 | 420 | 47 | 0.14 | 8.9 | C | C | C | C |
| Experimental Example 24 | 30 | 60 | 4 | 2500 | 2 | 250 | 0.43 | 380 | 43 | 0.18 | 10.4 | C | C | C | C |
| Experimental Example 25 | 60 | 108 | 2 | 1300 | 2 | 1650 | 0.63 | 770 | 72 | less than 0.01 | less than 0.1 | A | A | C | C |

TABLE 2-continued

| | Cleaning treatment step | | | Third heat treat- ment step (° C.) | Heating retention time (h) | Carbon material for catalyst carrier | | | | | | Performance evaluation | | | |
| --- | --- | --- | --- | --- | --- | --- | --- | --- | --- | --- | --- | --- | --- | --- | --- |
| | Concentration of hydrogen peroxide solution (% by mass) | Liquid temper- ature (° C.) | Treat- ment time (hr) | | | BET ($m^2$/g) | $V_{2-10}$ (mL/g) | $V_{macro}$ (cc/g) | ΔG ($cm^{-1}$) | $I_{750}/I_{peak}$ | Re- sidual weight ratio (%) | Rate of increase in particle size | Power gener- ation perform- ance | Dura- bility | Note |
| Experimental Example 26 | 60 | 108 | 2 | 1100 | 2 | 1720 | 0.61 | 740 | 73 | less than 0.01 | less than 0.1 | A | A | C | C |
| Experimental Example 27 | 30 | 60 | 4 | 2100 | 1 | 1080 | 0.58 | 540 | 64 | 0.03 | 0.7 | A | B | B | E |
| Experimental Example 28 | 30 | 60 | 4 | 2100 | 4 | 900 | 0.54 | 510 | 60 | 0.06 | 1.1 | A | B | B | E |

TABLE 3

| | Silver removal/ cleaning treatment step | | | Third heat treat- ment step (° C.) | Heating retention time (h) | Carbon material for catalyst carrier | | | | | | Performance evaluation | | | |
| --- | --- | --- | --- | --- | --- | --- | --- | --- | --- | --- | --- | --- | --- | --- | --- |
| | Concen- tration of nitric acid (% by mass) | Liquid temper- ature (° C.) | Treat- ment time (hr) | | | BET ($m^2$/g) | $V_{2-10}$ (mL/g) | $V_{macro}$ (cc/g) | ΔG ($cm^{-1}$) | $I_{750}/I_{peak}$ | Re- sidual weight ratio (%) | Rate of increase in particle size | Power gener ation perform- ance | Dura- bility | Note |
| Experimental Example 29 | 60 | 90 | 2 | 2100 | 2 | 970 | 0.56 | 500 | 60 | 0.13 | 3.9 | C | B | B | C |
| Experimental Example 30 | 30 | 60 | 2 | 2100 | 2 | 950 | 0.58 | 520 | 60 | 0.14 | 4.2 | C | B | B | C |

TABLE 4

| | Cleaning treatment step[*] | | | Third heat treat- ment step (° C.) | Heating retention time (h) | Carbon material for catalyst carrier | | | | | | Performance evaluation | | | |
| --- | --- | --- | --- | --- | --- | --- | --- | --- | --- | --- | --- | --- | --- | --- | --- |
| | Concen- tration of aqueous $KMnO_4$ solution (N) | Liquid temper- ature (° C.) | Treat- ment time (hr) | | | BET ($m^2$/g) | $V_{2-10}$ (mL/g) | $V_{macro}$ (cc/g) | ΔG ($cm^{-1}$) | $I_{750}/I_{peak}$ | Re- sidual weight ratio (%) | Rate of increase in particle size | Power gener- ation perform- ance | Dura- bility | Note |
| Experimental Example 31 | 0.4 | 80 | 4 | 2100 | 2 | 1050 | 0.68 | 610 | 63 | 0.02 | 0.4 | A | B | B | E |
| Experimental Example 32 | 0.4 | 80 | 2 | 2100 | 2 | 1020 | 0.65 | 590 | 62 | 0.04 | 0.6 | A | B | B | E |
| Experimental Example 33 | 1.0 | 60 | 3 | 2100 | 2 | 980 | 0.64 | 590 | 62 | 0.04 | 0.8 | A | B | B | E |
| Experimental Example 34 | 3.0 | 40 | 5 | 2100 | 2 | 950 | 0.64 | 570 | 62 | 0.07 | 1.3 | A | B | B | E |

TABLE 5

| | Third heat treatment step (° C.) | Heating retention time (h) | Carbon material for catalyst carrier | | | | | | Performance evaluation | | | |
| --- | --- | --- | --- | --- | --- | --- | --- | --- | --- | --- | --- | --- |
| | | | BET ($m^2$/g) | $V_{2-10}$ (mL/g) | $V_{macro}$ (cc/g) | ΔG ($cm^{-1}$) | $I_{750}/I_{peak}$ | Residual weight ratio (%) | Rate of increase in particle size | Power generation performance | Durability | Note |
| Experimental Example 35 | 1400 | 2 | 1200 | 1.0 | 1430 | 66 | less than 0.01 | less than 0.1 | A | C | C | C |
| Experimental Example 36 | 1700 | 2 | 580 | 0.58 | 1350 | 40 | less than 0.01 | less than 0.1 | A | C | C | C |
| Experimental Example 37 | 2000 | 2 | 360 | 0.26 | 1290 | 39 | 0.93 | 8.2 | C | C | C | C |

TABLE 6

| | Cleaning treatment step | | | Third | | Carbon material for catalyst carrier | | | | | | Performance evaluation | | | |
|---|---|---|---|---|---|---|---|---|---|---|---|---|---|---|---|
| | Concentration of hydrogen peroxide solution (% by mass) | Liquid temperature (° C.) | Treatment time (hr) | heat treatment step (° C.) | Heating retention time (h) | BET ($m^2/g$) | $V_{2\text{-}10}$ (mL/g) | $V_{macro}$ (cc/g) | $\Delta G$ ($cm^{-1}$) | $I_{750}/I_{peak}$ | Residual weight ratio (%) | Rate of increase in particle size | Power generation performance | Durability | Note |
| Experimental Example 38 | 30 | 60 | 4 | 2100 | 2 | 1320 | 1.25 | 600 | 62 | 0.03 | 0.5 | A | A | A | E |
| Experimental Example 39 | 30 | 60 | 4 | 1800 | 2 | 1480 | 1.38 | 650 | 68 | less than 0.01 | less than 0.1 | A | A | A | E |
| Experimental Example 40 | 30 | 60 | 4 | 1100 | 2 | 1780 | 1.53 | 680 | 72 | less than 0.01 | less than 0.1 | A | A | C | C |

*"Vacuum drying time in decomposition step" in Experimental Examples 38 to 40 = 2 hours

What is claimed is:

1. A carbon material for a catalyst carrier of a polymer electrolyte fuel cell, the carbon material being a porous carbon material and simultaneously satisfying (1), (2), (3) and (4) below:
   (1) an intensity ratio ($I_{750}/I_{peak}$) of an intensity at 750° C. ($I_{750}$) and a peak intensity in a vicinity of 690° C. ($I_{peak}$), in a derivative thermogravimetric curve (DTG) obtained by a thermogravimetric analysis when a temperature is raised at a rate of 10° C./min under an air atmosphere, is 0.10 or less;
   (2) a BET specific surface area, determined by BET analysis of a nitrogen gas adsorption isotherm, is from 400 to 1,500 $m^2/g$;
   (3) an integrated pore volume $V_{2\text{-}10}$ of a pore diameter of from 2 to 10 nm, determined by analysis of the nitrogen gas adsorption isotherm using Dollimore-Heal method, is from 0.4 to 1.5 mL/g; and
   (4) a nitrogen gas adsorption amount $V_{macro}$ at a relative pressure of from 0.95 to 0.99 in the nitrogen gas adsorption isotherm is from 300 to 1,200 cc(STP)/g.

2. The carbon material for a catalyst carrier of a polymer electrolyte fuel cell according to claim 1, wherein a residual weight ratio of a graphitized product at 750° C. in the thermogravimetric analysis when the temperature is raised at a rate of 10° C./min under an air atmosphere is 3% or less.

3. The carbon material for a catalyst carrier of a polymer electrolyte fuel cell according to claim 1, wherein a half width $\Delta G$ of a G-band detected in a range of from 1,550 to 1,650 $cm^{-1}$ in a Raman spectroscopic spectrum is from 50 to 70 $cm^{-1}$.

4. The carbon material for a catalyst carrier of a polymer electrolyte fuel cell according to claim 1, wherein the $V_{2\text{-}10}$ is from 0.5 to 1.0 mL/g.

5. The carbon material for a catalyst carrier of a polymer electrolyte fuel cell according to claim 1, comprising a three-dimensional dendritic structure in which a rod-shaped body or an annular body is three-dimensionally branched.

6. A method of producing a carbon material for a catalyst carrier of a polymer electrolyte fuel cell, the method comprising:
   a silver acetylide production step of blowing an acetylene gas into a reaction solution consisting of an aqueous ammonia solution of silver nitrate, to synthesize a silver acetylide;
   a decomposition step of allowing an autolysis explosive reaction of the silver acetylide, to obtain a carbon material intermediate;
   a silver removal step of bringing the carbon material intermediate into contact with a dilute nitric acid, to remove silver from the carbon material intermediate;
   a cleaning treatment step of bringing the carbon material intermediate, from which silver has been removed, into contact with an oxidizing agent solution, to clean the carbon material intermediate; and
   a heat treatment step of heat-treating the cleaned carbon material intermediate at a temperature of from 1,400 to 2,200° C. in a vacuum or in an inert gas atmosphere, to obtain a carbon material for a catalyst carrier,
   wherein at least one selected from the group consisting of a permanganate solution and a hydrogen peroxide solution is used as the oxidizing agent solution.

7. The method according to claim 6, wherein the carbon material is a porous carbon material.

8. The method according to claim 7, wherein the carbon material simultaneously satisfies (1), (2), (3) and (4) below:
   (1) an intensity ratio ($I_{750}/I_{peak}$) of an intensity at 750° C. ($I_{750}$) and a peak intensity in a vicinity of 690° C. ($I_{peak}$), in a derivative thermogravimetric curve (DTG) obtained by a thermogravimetric analysis when a temperature is raised at a rate of 10° C./min under an air atmosphere, is 0.10 or less;
   (2) a BET specific surface area, determined by BET analysis of a nitrogen gas adsorption isotherm, is from 400 to 1,500 $m^2/g$;
   (3) an integrated pore volume $V_{2\text{-}10}$ of a pore diameter of from 2 to 10 nm, determined by analysis of the nitrogen gas adsorption isotherm using Dollimore-Heal method, is from 0.4 to 1.5 mL/g; and
   (4) a nitrogen gas adsorption amount $V_{macro}$ at a relative pressure of from 0.95 to 0.99 in the nitrogen gas adsorption isotherm is from 300 to 1,200 cc(STP)/g.

9. The method accordingly to claim 8, wherein a residual weight ratio of a graphitized product at 750° C. in the thermogravimetric analysis when the temperature is raised at a rate of 10° C./min under an air atmosphere is 3% or less.

10. The method accordingly to claim 8, wherein a half width $\Delta G$ of a G-band detected in a range of from 1,550 to 1,650 $cm^{-1}$ in a Raman spectroscopic spectrum is from 50 to 70 $cm^{-1}$.

11. The method accordingly to claim 8, wherein the $V_{2\text{-}10}$ is from 0.5 to 1.0 mL/g.

12. The method accordingly to claim 8, further comprising a three-dimensional dendritic structure in which a rod-shaped body or an annular body is three-dimensionally branched.

13. The carbon material for a catalyst carrier of a polymer electrolyte fuel cell according to claim 1, wherein the BET specific surface area, determined by BET analysis of a nitrogen gas adsorption isotherm, is from 500 to 1,400 m²/g.

14. The carbon material for a catalyst carrier of a polymer electrolyte fuel cell according to claim 1, the intensity ratio is 0.09 or less.

15. The carbon material for a catalyst carrier of a polymer electrolyte fuel cell according to claim 1, wherein the nitrogen gas adsorption isotherm is from 300 to 800 cc(STP)/g.

16. The carbon material for a catalyst carrier of a polymer electrolyte fuel cell according to claim 1, wherein the residual weight ratio of the graphitized product at 750° C. in the thermogravimetric analysis when the temperature is raised at a rate of 10° C./min under an air atmosphere is 2% or less.

17. The method accordingly to claim 8, wherein the BET specific surface area, determined by BET analysis of a nitrogen gas adsorption isotherm, is from 500 to 1,400 m²/g.

18. The method accordingly to claim 8, wherein the intensity ratio is 0.09 or less.

19. The method accordingly to claim 8, wherein the nitrogen gas adsorption isotherm is from 300 to 800 cc(STP)/g.

20. The method accordingly to claim 8, wherein the residual weight ratio of the graphitized product at 750° C. in the thermogravimetric analysis when the temperature is raised at a rate of 10° C./min under an air atmosphere is 2% or less.

* * * * *